(12) United States Patent
Chen et al.

(10) Patent No.: US 9,940,550 B2
(45) Date of Patent: *Apr. 10, 2018

(54) MODEL COMPRESSION IN BINARY CODED IMAGE BASED OBJECT DETECTION

(71) Applicant: Intel Corporation, Santa Clara, CA (US)

(72) Inventors: Ke Chen, Cupertino, CA (US); Bongjin Jun, Seoul (KR); Yi-Jen Chiu, San Jose, CA (US); Tae-Hoon Kim, Seoul (KR); Dukhwan Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,563

(22) Filed: Feb. 16, 2017

(65) Prior Publication Data

US 2017/0161588 A1 Jun. 8, 2017

Related U.S. Application Data

(63) Continuation of application No. 14/567,147, filed on Dec. 11, 2014.

(51) Int. Cl.
*G06K 9/00* (2006.01)
*G06K 9/62* (2006.01)
*H04N 19/90* (2014.01)

(52) U.S. Cl.
CPC .......... *G06K 9/6267* (2013.01); *H04N 19/90* (2014.11)

(58) Field of Classification Search
None
See application file for complete search history.

(56) References Cited

U.S. PATENT DOCUMENTS

| 7,050,639 | B1 | 5/2006 | Barnes et al. |
| 7,319,797 | B2 | 1/2008 | Hung |
| 8,384,122 | B1 | 2/2013 | Hu et al. |
| 2007/0014482 | A1 | 1/2007 | Kim et al. |
| 2011/0084319 | A1 | 4/2011 | Zhu et al. |
| 2011/0293173 | A1 | 12/2011 | Porikli et al. |

(Continued)

FOREIGN PATENT DOCUMENTS

| CN | 100357958 | 12/2007 |
| CN | 101369315 | 2/2009 |

(Continued)

OTHER PUBLICATIONS

Non-Final Office Action, dated Aug. 26, 2016, for U.S. Appl. No. 14/567,147.

(Continued)

*Primary Examiner* — Delomia L Gilliard
(74) *Attorney, Agent, or Firm* — Green, Howard & Mughal, LLP

(57) ABSTRACT

Techniques related to object detection using binary coded images are discussed. Such techniques may include performing object detection based on multiple spatial correlation mappings between a generated binary coded image and a binary coded image based object detection model and nesting look up tables such that binary coded representations are grouped and such groups are associated with confidence values for performing object detection.

29 Claims, 14 Drawing Sheets

(56) References Cited

U.S. PATENT DOCUMENTS

| | | |
|---|---|---|
| 2011/0303950 A1 | 12/2011 | Lauer et al. |
| 2012/0043607 A1 | 2/2012 | Luisier et al. |
| 2013/0060765 A1* | 3/2013 | Lin .................. G06F 17/30259 707/723 |
| 2013/0223683 A1 | 8/2013 | Jiang et al. |
| 2013/0272575 A1 | 10/2013 | Li et al. |
| 2015/0003743 A1 | 1/2015 | Nosaka |

FOREIGN PATENT DOCUMENTS

| | | |
|---|---|---|
| CN | 101520850 | 9/2009 |
| CN | 1989525 | 5/2010 |
| CN | 102281388 | 12/2011 |
| TW | 200704179 | 1/2007 |
| WO | 2013063765 | 5/2013 |

OTHER PUBLICATIONS

Notice of Allowance, dated Dec. 14, 2016, for U.S. Appl. No. 14/567,147.

Fröba, B. et al., "Face Detection with the Modified Census Transform", Proceedings of the 6th IEEE Int'l conf on Automatic Face and Gesture Recognition (FGR'04), 2004, IEEE, 6 pages.

Jin, H. et al., "Face Detection Using Improved LBP Under Bayesian Framework", Proceedings of the 3rd Int'l Conf on Image and Graphics (ICIG'04), 2004, IEEE, 4 pages.

Jun et al., "Robust Face Detection Using Local Gradient Patterns and Evidence Accumulation", Pattern Recognition 45, vol. 45, Iss. 9, Sep. 2012, p. 3304-3316.

Li, J. et al., "Face Detection using SURF Cascade", 2011 IEEE Int'l Conf on Computer Vision Workshops, 2011, IEEE, pp. 2183-2190 (8 pages).

Viola, P. et al., "Robust Real-time Object Detection", Cambridge Research Laboratory Technical Report Series, CRL 2001/01 Feb. 2001, 30 pages.

Bay, H. et al "Speeded-Up Robust Features (SURF)", Computer Vision and Image Understanding, Academic Press, US, vol. 110. No. 3, Jun. 1, 2008, pp. 346-359, XP022652944.

Huang, D. et al. "Local Binary Patterns and Its Application to Facial Image Analysis: A Survey", IEEE Transactions on Systems, Man, and Cybernetics: Part C: Applications and Reviews, IEEE Service Center, Piscataway, NJ, US, vol. 41, No. 6, Nov. 1, 2011, pp. 765-781, XP011363204.

Lienhart, R. et al. "Empirical Analysis of Detection Cascades of Boosted Classifiers for Rapid Object Detection", Electronic Publishing, Artistic Imaging, and Digital Typography; Springer Verlag, DE, vol. 2781, Jan. 1, 2013, pp. 297-304, XP002374203.

Roy, A. et al. "Haar Local Binary Pattern Feature or Fast Illumination Invariant Face Detection", Computer Vision Using Local Binary Patterns, Jun. 22, 2011, pp. 1-12, XP055443196.

Viola, P. et al. "Rapid Object Detection using a Boosted Cascade of Simple Features", Proceedings of the 2001 IEEE Computer Society Conference on Computer Vision and Pattern Recognition. CVPR 2001, vol. 1, Jan. 1, 2001, pp. 1-511, XP055141503 *Integration of Multiple Detections: p. 517*.

Wu, B. et al. "Fast Rotation Invariant multi-View Face Detection Based on Real Adaboost", Proceedings 6th IEEE Int'l Conference on Automatic Face and Gesture Recognition, 2004. Piscataway, NJ, May 17, 2004, pp. 79-84, XP010949414.

Zhang, H. et al. "Object Detection using Spatial Histogram Features", Image and Vision Computing, Elsevier, Guildford, GB, vol. 24, No. 4, Apr. 1, 2006, pp. 327-341, XP027994846 *section 2, step 3; figure 1*.

Zhang, L. et al. "Face Detection Based on Mulit-Block LBP Representation", Lecture Notes in Computer Science, vol. 4642, Jan. 1, 2007, pp. 11-18, XP055200341, Berlin, Heidelberg, ISSN: 0302-9743.

Zhang, W. "Multi-Resolution Histograms of Local Variation Patterns (MHLVP) for Robust Face Recognition", Audio-and Video-based Biometric Person Authentication; Springer-Verlag, Berlin/Heidelberg, pp. 937-944, XP019013357.

Zhen, L. et al. "Discriminant image filter learning for face recognition with local binary pattern like representation", 2012 IEEE Conference on Computer Vision and Pattern Recognition, Jun. 16, 2012, pp. 2512-2517, Audio- and Video-based Biometric Person Authentication; Springer-Verlag, Berlin/Heidelberg, pp. 937-944.

* cited by examiner 1100
1101  1102  1103
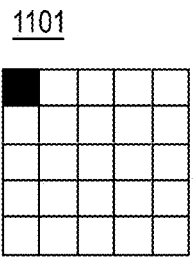 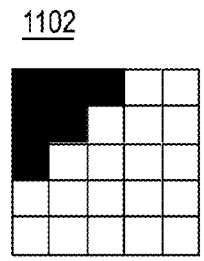 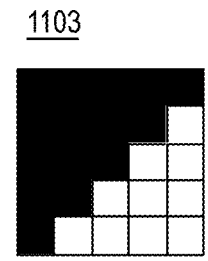
↑ ↑ ↑
1104  1105  1106
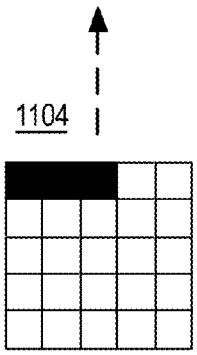 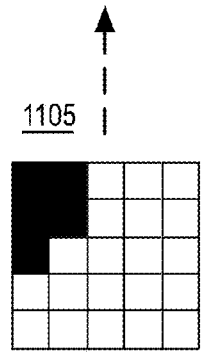 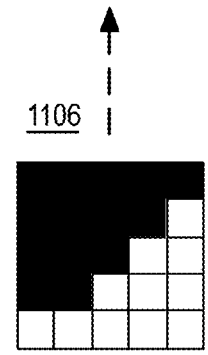
1107  1108
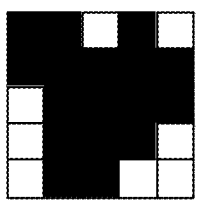 
FIG. 11

1500

Generate Binary Coded Image
1501

Perform Object Detection for a First Spatial Correlation between the Binary Coded Image and an Object Detection Model
1502

Perform Object Detection for a Second Spatial Correlation between the Binary Coded Image and the Object Detection Model
1503

Access a First Look Up Table of Group Numbers Indexed by Binary Coded Representation Values to Determine a Group Number for an Individual Binary Coded Representation
1601

Access a Second Look Up Table of Confidence Values to Determine a Confidence Value for the Individual Binary Coded Representation
1602

Perform Object Detection based on the Confidence Value
1603

FIG. 16

MODEL COMPRESSION IN BINARY CODED IMAGE BASED OBJECT DETECTION

CLAIM FOR PRIORITY

This application is a continuation of U.S. patent application Ser. No. 14/567,147, filed on 11 Dec. 2014 and entitled "MODEL COMPRESSION IN BINARY CODED IMAGE BASED OBJECT DETECTION", which is incorporated by reference in entirety.

BACKGROUND

Object detection may be used to determine whether and/or where in an image a certain object such as a human face, a human body, an automobile, or the like appears. For example, face detection may be used in human-computer interaction, photo album management, biometrics, video surveillance, automatic focus in camera imaging, image or video search and retrieval, and the like.

In some implementations, cascade classifiers may be used to perform object detection. To support multiple object detection models (e.g., to search for multiple objects while performing a search), different models are trained for implementation by the cascade classifier in a detection phase. For example, to support profile face detection and rotated face detection, different models (e.g., a different model for each rotation or profile) may be trained and implemented for such profiles and rotations.

However, such implementations may use substantial memory space and power particularly in mobile devices. Furthermore, even in larger form factor devices such as laptop computers and the like having powerful central processing units, such implementations may cause cache thrashing due to rapid exchanges in memory, which may significantly decrease the performance of the implemented object detector.

As such, existing techniques do not provide object detection implementations with model sizes that are suitable for mobile devices and for high performance system performance. Such problems may become critical as object detection becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 11 illustrates example object detection patch patterns;

FIG. 15 is a flow diagram illustrating an example process for performing object detection;

FIG. 16 is a flow diagram illustrating an example process for performing object detection;

DETAILED DESCRIPTION

Figure 1:
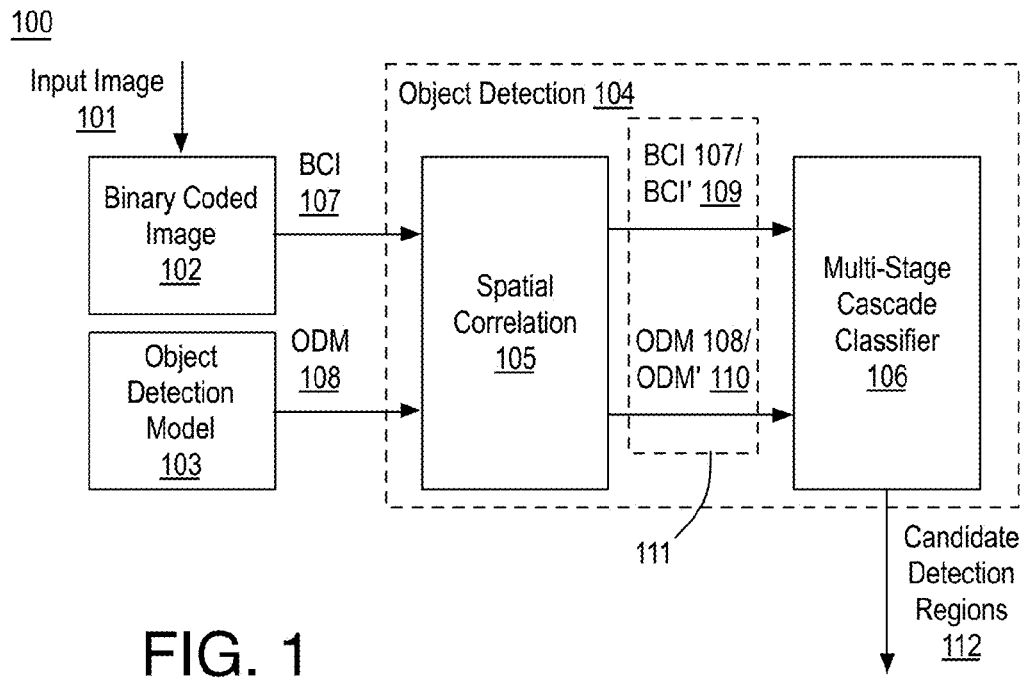
FIG. 1 is an illustrative diagram of an example system for providing object detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof.

The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to object detection and, in particular, to object detection implementations having model compression or reduced model sizes.

As described above, it may be advantageous to provide object detection (e.g., face detection) in many environments. It may be desirable for such object detection implementation to detect multiple models and/or multiple orientations of such models. Furthermore, it may be advantageous to provide such object detection in implementations with limited memory resources such as on mobile devices or such that memory access does not cause cache thrashing. As discussed herein, object detection model compression may be achieved by training only a limited number of native models based on symmetrical binary coded image based techniques. Other models used in object detection may be determined based on the native models and, in particular, based on the symmetrical binary coded images.

For example, in some embodiments, a binary coded image may be generated based on individual pixels of at least a portion of an input image. The binary coded image may include binary coded representations for each of the pixels of the individual pixels as is discussed further herein. For a portion of the input image such as a scan window, the binary coded image may be evaluated based on the binary coded image and a binary coded image based object detection model such that the binary coded image and the binary coded image based object detection model have a spatial correlation therebetween. For example, the model may represent a vertically aligned face and the scan window may be vertically aligned with respect to the input image. Such object detection may include a multi-stage cascade classifier for example.

The binary coded image based object detection model and/or the scan window may be adjusted (e.g., via coordinates mapping and bit shifting to effect a rotation or mirroring or the like as is discussed further herein) to provide another spatial correlation between the binary coded image and the binary coded image based object detection model. For example, the second spatial correlation may provide for a model having a horizontally aligned face and the scan window may still be vertically aligned with respect to the input image. The scan window may again be evaluated (e.g., via object detection) based on the second spatial correlation (e.g., again using a cascade classifier or the like). Such spatial realignments and object detections may be repeated for any number of spatial correlations. Using such techniques, multiple models may be evaluated based on one native model such that the native model may be stored in memory and other models may be generated and evaluated on the fly. Such techniques may save memory and prevent cache thrashing. As is discussed further herein, such techniques may be repeated via implementation of multiple stages of a cascade filter, for multiple scan windows, for multiple scalings of the input image, and for multiple native models to provide object detection for the input image. Positive results from such implementations (e.g., scan windows passing all stages of a cascade filter for a particular model and spatial correlation) may be merged for presentment to a user or use via another application or the like.

Furthermore, as discussed herein, in the training phase of the binary coded image based object detection model, redundancy in the object detection model may be removed by grouping based on binary coded representation values. Such techniques may compress or reduce the size of the model implemented for object detection. For example, in the detection or implementation phase, the model may be implemented via multiple look up tables reducing the size of the object detection model in comparison to a single look up table implementation.

For example, in some embodiments, in a training phase, binary coded representation values may be grouped such that a first look up table may be generated that includes group numbers indexed by binary coded representation values (e.g., 8 bit binary coded representation values) and a second look up table may be generated including confidence values indexed by the group numbers. Such grouping and multiple look up tables may provide a reduced model size based on redundancy reduction or elimination (e.g., if the binary coded representations have the same confidence values they may be grouped without loss of information) and with the loss of some granularity in some examples. However, such loss of granularity may not substantially impact the results of implementing the model. Such a nested look up table structure may be provided for each pixel coordinate within a scan window for example.

In some embodiments, in a detection or implementation phase, a look up table having group numbers indexed by binary coded representation values may be accessed to determine an individual group number associated with an individual binary coded representation for a pixel of an input image and another look up table having confidence values indexed by the group numbers may be accessed to determine an individual confidence value associated with the individual binary coded representation. Furthermore, object detection may be performed for the input image based at least in part on the confidence value as is discussed further herein. For example, confidence values for all target pixel coordinates within a scan window may be determined using nested look up table structures, summed, and compared to a threshold to determine whether the scan window passes a particular stage of a cascade classifier. In the described example, two look up tables are implemented. In other examples, three or more nested look up tables may be implemented.

As discussed, model compression in binary coded image based object detection frameworks may be achieved by training only a limited number of native models and generating other models or spatial correlations based on the limited number of native models and/or by grouping binary coded representations into groups and associating confidence values with the groups. Such techniques may be implemented separately or they may be implemented together. Such implementations may achieve the same or better quality with reduced overall model size as compared to multiple model and single look up table per pixel coordinates techniques.

FIG. 1 is an illustrative diagram of an example system 100 for providing object detection, arranged in accordance with at least some implementations of the present disclosure. As shown in FIG. 1, system 100 may include a binary coded image module 102, an object detection model module 103, and an object detection module 104. Furthermore, as shown, object detection module 104 may include a spatial correlation module 105 and a multi-stage cascade classifier 106. Also as shown, binary coded image module 102 may receive an input image 101. Input image 101 may include any suitable image or image file such as, for example, a real-time image, a decoded image, a captured image (e.g., via a camera or the like), a rendered image, an image from a sequence of video images or frames, an image retrieved from memory, or the like. In some examples, input image may be a video graphics array (VGA), high definition (HD), Full-HD (e.g., 1080p), or 4K resolution image or video frame. In an embodiment, input image 101 is a raw image. In some examples, input image 101 may be a color image. In an embodiment, input image 101 is a gray-scale image. As is discussed further herein, in some examples, input image 101 may be a resized (e.g., scaled) image based on an input or target image such that the operations discussed with respect to system 100 may be repeated for various scaled images of an input image to detect object candidate detection regions 112.

As shown, binary coded image module 102 may process input image 101 to generate binary coded image (BCI) 107 based on input image 101. Binary coded image 107 may include multiple binary coded representations each associated with a pixel of individual pixels of input image 101. For example, binary coded image module 102 may, for individual pixels of input image 101, determine binary coded image 107 based on pixel values of neighboring pixel of each of the individual pixels and weights associated with locations of the neighboring pixel values relative to the individual pixels. For example, the neighboring pixels may be neighboring pixels in a pattern around each of the individual pixels. As is discussed further herein, a weighted average of the neighboring pixel values may be determined for the individual pixel and the weighted average may be used as a threshold for the neighboring pixel values. The neighboring pixel values may be thresholded and sequenced (e.g., provided a value of 0 or 1 based on the thresholding and sequenced based on a predetermined order) to generate a binary coded representation for the individual pixel. Such techniques may be repeated for any number of pixels and may provide a binary bitstream. For example, binary coded image 107 may include the binary bitstream.

FIGS. 2A, 2B, 2C, and 2E illustrate neighboring pixels in example patterns around an individual pixel 201, arranged in accordance with at least some implementations of the present disclosure.

Figure 2A:
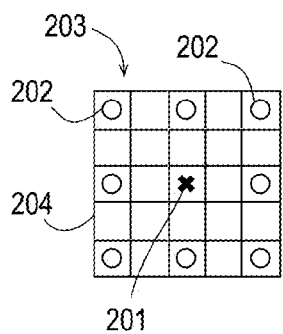
FIGS. 2A, 2B, 2C, 2D, and 2E illustrate neighboring pixels in example patterns around an individual pixel.

As shown in FIG. 2A, neighboring pixels 202 (illustrated via circles) may be in an example pattern 203 within a window 204 around individual pixel 201 (illustrated via an X). As shown, pattern 203 may include neighboring pixels 202 (in FIGS. 2A-2E only some neighboring pixels are labeled for the sake of clarity of presentation) arranged at the corners and centered along the edges of 5 by 5 pixel window 204 and pattern 203 may include 8 neighboring pixels 202 of individual pixel 201. For example, each neighboring pixel 202 has 1 pixel between itself and individual pixel 201 (e.g., oriented horizontally, vertically, or diagonally) in pattern 203. In another example (not illustrated), window 204 may be 7 by 7 pixels and neighboring pixels 202 may be arranged at the corners and centered along the edges of a 7 by 7 window and each neighboring pixel 202 may have 2 pixels between itself and individual pixel (e.g., oriented horizontally, vertically, or diagonally).

Figure 2B:
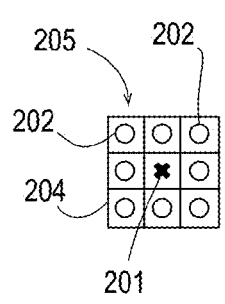

As shown in FIG. 2B, neighboring pixels 202 may be in an example pattern 205 within window 204 around individual pixel 201. As shown, pattern 205 may include neighboring pixels 202 arranged immediately around individual pixel 201 and within a 3 by 3 pixel window 204. Furthermore, as shown, pattern 205 may include 8 neighboring pixels 202 of individual pixel 201. In another example (not illustrated), window 204 may be 5 by 5 pixels, neighboring pixels 202 may be arranged immediately around individual pixel 201 in two layers (one layer immediately around individual pixel 201 and a second layer immediately around the first layer) and the pattern may include 24 neighboring pixels.

Figure 2C:
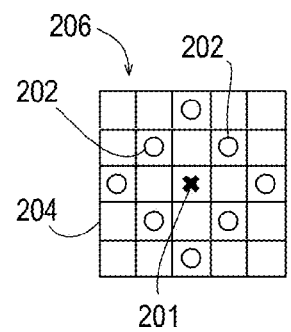

As shown in FIG. 2C, neighboring pixels 202 may be in an example pattern 206 within window 204 around individual pixel 201. As shown, pattern 206 may include neighboring pixels 202 arranged in a diamond pattern around individual pixel 201 within a 5 by 5 pixel window 204. Furthermore, pattern 206 may include 8 neighboring pixels 202 of individual pixel 201. For example, the diamond pattern may extend between four neighboring pixels 202 centered along the top, sides and bottom edges of window 204 as shown. In another example (not illustrated), window 204 may be 7 by 7 pixels and neighboring pixels 202 may be arranged in a diamond pattern around individual pixel 201 that extends between four neighboring pixels centered along the top, sides and bottom edges of window 204 such that the diamond pattern may include 12 neighboring pixels. In yet another example (not illustrated), window 204 may be 3 by 3 pixels and neighboring pixels 202 may be arranged in a diamond pattern around individual pixel 201 that includes 4 neighboring pixels: one each immediately above, below, to the left of, and to the right of individual pixel 201.

Figure 2D:
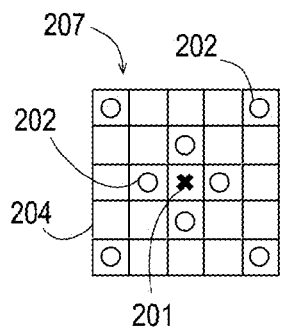

As shown in FIG. 2D, neighboring pixels 202 may be in an example pattern 207 within window 204 around individual pixel 201. As shown, pattern 207 may include neighboring pixels 202 arranged in a 4 pixel diamond pattern around individual pixel 201 and at the corners of 5 by 5 pixel window 204 such that pattern 207 may include 8 neighboring pixels 202 of individual pixel 201. For example, the diamond pattern may be around individual pixel 201 and may include 4 neighboring pixels immediately above, below, to the left of, and to the right of individual pixel 201. In another example (not illustrated), window 204 may be 7 by 7 pixels and neighboring pixels 202 may be arranged in a diamond pattern around individual pixel 201 analogous to the pattern of FIG. 2C and with neighboring pixels 208 at the corners of the 7 by 7 window such that the pattern includes 12 neighboring pixels 208.

Figure 2E:
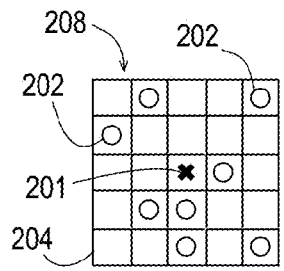

As shown in FIG. 2E, neighboring pixels 202 may be in an example pattern 208 within window 204 around individual pixel 201. As shown, pattern 208 may include 8 neighboring pixels 202 arranged in a selected or heuristically determined pattern around individual pixel 201. As shown, neighboring pixels 202 may be directly to the right of individual pixel 201, directly below individual pixel 201, down and to the left of individual pixel 201, at an upper right corner of window 211, at a lower right corner of window 211, centered along a bottom edge of window 211, to the right of the top left corner of window 211, and below the top left corner of window 211. In other examples, neighboring pixels 202 may be arranged in any selected or heuristically determined pattern with any number of neighboring pixels 202.

As shown, in some examples, the neighboring pixels may include 8 neighboring pixels, however, the embodiments discussed herein are not so limited. Any number of neighboring pixels such as 4, 8, 12, or any number of pixels in the range of 4-12, or more neighboring pixels may be used. Furthermore, the neighboring pixels may be within a window of any size such as 3 by 3 pixels, 5 by 5 pixels, or 7 by 7 pixels, or the like. Furthermore, the illustrated and discussed windows are square, but other shapes such as rectangular shapes may be used.

Returning to FIG. 1, as discussed, binary coded image module 102 may, for individual pixels of input image 101, determine thresholds as a directional weighted averages based on pixel values of neighboring pixels of each of the individual pixels and weights associated with locations of the neighboring pixel values relative to the individual pixels. For example, a threshold may be generated for each individual pixel. Based on the threshold, the neighboring pixel values may be assigned values (e.g., 0 or 1) and sequenced to generate binary coded representations for the individual pixels. FIGS. 2A-2E illustrate example neighboring pixel patterns and the illustrated neighboring pixels may have pixel values based on gray scale values of input image 101, luma values of input image 101, or the like. Any suitable weights for neighboring pixels 202 may be used.

FIGS. 3A, 3B, 3C, and 3D illustrate example weights for neighboring pixels of an individual pixel 201, arranged in accordance with at least some implementations of the present disclosure.

Figure 3A:
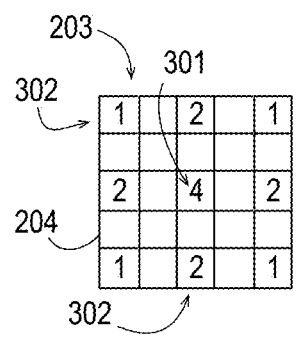
FIGS. 3A, 3B, 3C, and 3D illustrate example weights for neighboring pixels of an individual pixel.

As shown in FIG. 3A, individual pixel weight value 301 and neighboring pixel weight values 302 may be arranged in pattern 203 (as previously illustrated in FIG. 2A) within a window 204. As shown, individual pixel weight value 301 and neighboring pixel weight values 302 (in FIGS. 3A-3D only some neighboring pixels are labeled for the sake of clarity of presentation) may include a weight for the individual pixel and each neighboring pixel in pattern 203. In the illustrated embodiment, individual pixel weight value 301 is 4, corner neighboring pixel weight values 302 are 1 and neighboring pixel weight values 302 centered along the edges of 5 by 5 pixel window 204 are 2. In various examples, individual pixel weight value 301 and neighboring pixel weight values 302 may include any suitable weighting values that provide, for example, local texture improvement, resistance to noise, and/or filtering for input image 101. For example, individual pixel weight value 301 and neighboring pixel weight values 302 may be in the range of about 0 to 2, in the range of about 0 to 4, in the range of about 1 to 4, or in the range of about 1 to 8 or the like.

Figure 3B:
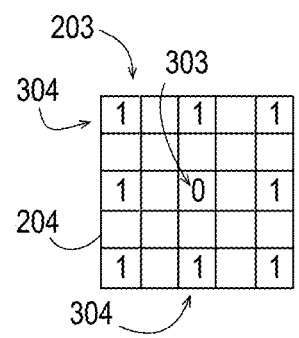

As shown in FIG. 3B, individual pixel weight value 303 and neighboring pixel weight values 304 may be arranged in pattern 203 (as previously illustrated in FIG. 2A) within a window 204. As shown, individual pixel weight value 303 and neighboring pixel weight values 304 may include a weight for the individual pixel and each neighboring pixel in pattern 203. In the illustrated embodiment, individual pixel weight value 303 is 0 (e.g., individual pixel 201 is not used in determining the directional weighted average) and corner neighboring pixel weight values 302 and neighboring pixel weight values 302 centered along the edges of 5 by 5 pixel window 204 are 1. In the example of FIG. 3B, the neighboring pixels of pattern 203 may all be equally weighted.

Figure 3C:
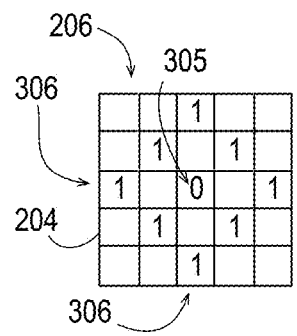

As shown in FIG. 3C, individual pixel weight value 305 and neighboring pixel weight values 306 may be arranged in pattern 206 (as previously illustrated in FIG. 2C) within a window 204. As shown, individual pixel weight value 305 and neighboring pixel weight values 306 may include a weight for the individual pixel and each neighboring pixel in pattern 206. In the illustrated embodiment, individual pixel weight value 305 is 0 (e.g., individual pixel 201 is not used in determining the directional weighted average) and neighboring pixel weight values 306 are all 1. In the example of FIG. 3C, the neighboring pixels may all be equally weighted. In other examples, neighboring pixel weight values 306 may include different weighting values. In some examples, weight values at the center of the edges of window 204 (e.g., the points of the diamond of shape 206) may have a greater value than the remaining neighboring pixel weight values 306. In other examples, weight values at the center of the edges of window 204 (e.g., the points of the diamond of shape 206) may have a lesser value than the remaining neighboring pixel weight values 306. For example, the neighboring pixel weight values 306 may be in the range of about 0 to 2, in the range of about 0 to 4, in the range of about 1 to 4, or in the range of about 1 to 8 or the like.

Figure 3D:
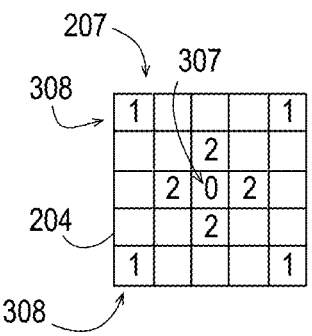

As shown in FIG. 3D, individual pixel weight value 307 and neighboring pixel weight values 308 may be arranged in pattern 207 (as previously illustrated in FIG. 2D) within a window 204. As shown, individual pixel weight value 307 and neighboring pixel weight values 308 may include a weight for the individual pixel and each neighboring pixel in pattern 207. In the illustrated embodiment, individual pixel weight value 307 is 0 (e.g., individual pixel 201 is not used in determining the directional weighted average), corner neighboring pixel weight values 308 are 1 and neighboring pixel weight values 308 arranged in a diamond around the individual pixel (e.g., above, below, right of, and left of the individual pixel) are 2. In various examples, individual pixel weight value 307 and neighboring pixel weight values 308 may include any suitable weighting values that provide local texture improvement, resistance to noise, and/or filtering for input image 101. For example, individual pixel weight value 307 and neighboring pixel weight values 308 may be in the range of about 0 to 2, in the range of about 0 to 4, in the range of about 1 to 4, or in the range of about 1 to 8 or the like.

Similarly, weight values may be determined for other patterns as discussed herein. In such examples, the individual pixel weight value and neighboring pixel weight values may include any suitable weighting values that provide, for example, local texture improvement, resistance to noise, and/or filtering for input image 101. For example, individual pixel weight value and neighboring pixel weight values may be in the range of about 0 to 2, in the range of about 0 to 4, in the range of about 1 to 4, or in the range of about 1 to 8 or the like. In some embodiments, the weight values may be predetermined or heuristically determined or the like.

As discussed, patterns (e.g., with respect to FIGS. 2A-2E) and weights (e.g., with respect to FIGS. 3A-3D) may be used to determine a threshold for an individual pixel of input image 101. In some examples, the pattern and weights implemented may be predefined or preselected for implementation. In some examples, the pattern and weights implemented may be adaptively selected based on the input image. For example, input image 101 may be evaluated for various conditions (e.g., low light conditions, good lighting conditions, high or low contrast, or the like) and patterns and/or weights may be determined based on the evaluation. For example, an input image having good lighting conditions may implement a pattern having a larger neighborhood and/or more neighbor pixels to determined adaptive weighted averages while an input image having low light conditions may implement a pattern having a smaller neighborhood and/or fewer neighbor pixels to determined adaptive weighted averages. Furthermore, such adapting of patterns and/or weights may be implemented within input image 101 (e.g., on a portion or slice or the like of input image 101).

Also as discussed, the thresholds for individual pixels may be used to threshold neighboring pixel values to determine assigned values. The assigned values may be sequenced to generate a binary coded representations for the individual pixels.

Figure 4:
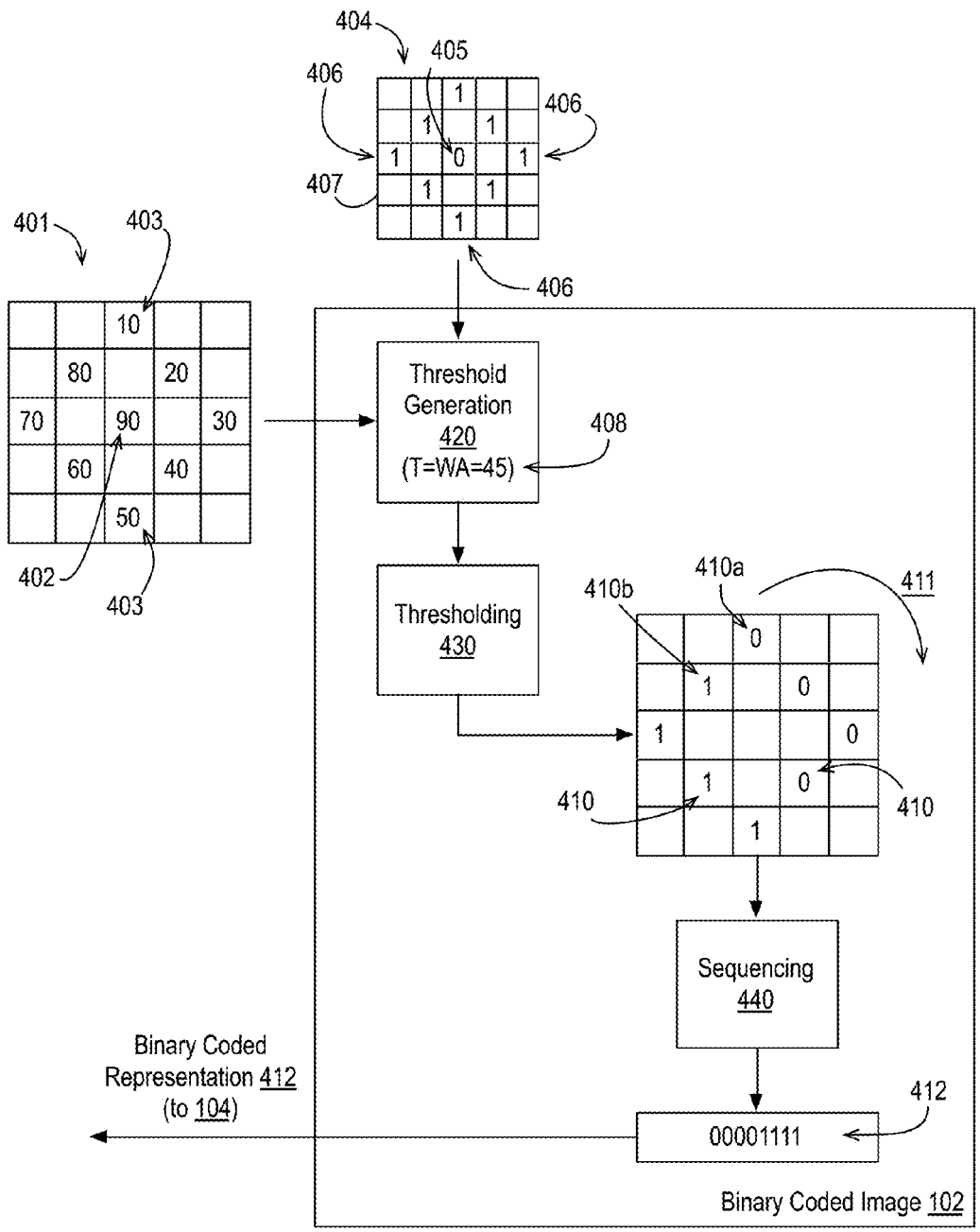
FIG. 4 illustrates a portion of example system for generating an example binary coded representation.

FIG. 4 illustrates a portion of example system 100 for generating example binary coded representation 412, arranged in accordance with at least some implementations of the present disclosure. As shown, binary coded image module 102 may include a threshold generation module 420, a thresholding module 430, and a sequencing module 440.

For example, based on the discussed individual pixel value, neighboring pixel values, individual pixel weight value, and/or neighboring pixel weight values, threshold generation module 420 may determine a threshold 408 as a directional weighted average for the individual pixel. For example, the threshold may be based at least on pixel values of neighbor pixels of the individual pixels and weights associated with locations of each of the neighbors pixels relative to the individual pixels (as discussed). In an embodiment, the threshold is generated as a summation of the products of each of the pixel values of the neighboring pixels and each of the associated first plurality of weights divided by a summation of the first plurality of weights. For example, the threshold may be determined as a weighted average value as shown in Expression (1):

$$x_a = \frac{\left(\begin{array}{c} w_0 x_0 + w_1 x_1 + w_2 x_2 + w_3 x_3 + w_4 x_4 + \\ w_5 x_5 + w_6 x_6 + w_7 x_7 + w_8 x_8 \end{array}\right)}{(w_0 + w_1 + w_2 + w_3 + w_4 + w_5 + w_6 + w_7 + w_8)} \quad (1)$$

where $x_a$ may be the threshold for the individual pixel, $x_0$ may be the individual pixel value (e.g., gray scale value), $x_1$, $x_2$, ..., $x_8$ may be the pixel values (e.g., gray scale values) for the neighboring pixels, $w_0$ may be the individual pixel value weight, and $w_1$, $w_2$, ..., $w_8$ may be the neighboring pixel value weights. For example, the individual pixel value weight and neighboring pixel value weights may be predetermined as discussed. For example, the neighboring pixel value weights may be predetermined based on their positions with respect to the individual pixel. Such a directional weighed average may provide a threshold for an individual pixel of input image 101 for object detection. For example, pattern 203 and weights 301, 302 may provide a low pass filter.

In such a manner, binary coded image module 102 (e.g., via threshold generation module 420) may determine thresholds for pixels of input image 101. In some examples, binary coded image module 102 may determine thresholds for all pixels of input image 101. In some examples, binary coded image module 102 may determine thresholds for some or most pixels of input image 101. For example, boundary or edge pixels of input image 101 may not have certain neighbors for calculating a directional weighted average (e.g., a boundary pixel along the top edge of input image 101 may not have neighbors above it). Such boundary or edge pixels may be discarded, left unchanged (e.g., no weighted average may be taken and the pixel value may be used), or an altered pattern may be used to determine a directional weighted average for edge or boundary pixels.

For example, as shown in FIG. 4, binary coded image module 102 may receive a portion 401 of input image 101 (or determine or generate portion 401 based on received input image 101 or the like). For example, portion 401 of input image 101 may include individual pixel value 402 (e.g., a value of 90) and neighboring pixel values 403 (e.g., values of 10, 20, 30, 40, 50, 60, 70, and 80; in FIG. 4, only a few of neighboring pixel values 403 are labeled for the sake of clarity). Binary coded image module 102 may also receive (or determine or the like) weighted pattern 404, which may include individual pixel weight value 405 and neighboring pixel weight values 406 (in FIG. 4, only a few of neighboring pixel weight values 406 are labeled for the sake of clarity) within window 407. In the example of FIG. 4, weighted pattern 404 corresponds to pattern 206 of weights 305, 306 as discussed herein with respect to FIG. 3C, however, the embodiments discussed herein are not so limited.

As discussed herein, binary coded image module 102, via threshold generation module 420, may determine a threshold 408 (T) as a weighted average (WA) for the individual pixel based on a weighted averaging of individual pixel value 402 and neighboring pixel values 403 and based on individual pixel weight value 405 and neighboring pixel weight values 406. Based on the illustrated example, threshold 408 for the individual pixel is 45 (e.g., please refer to Expression (1)).

As shown, binary coded image module 102 may generate a binary coded representation 412 for the individual pixel associated with individual pixel value 402. For example, binary coded image module 102 may determine binary coded representation 412 as follows. As shown, binary coded image module 102, via thresholding module 430, may apply threshold 408 to neighboring pixel values 403 to generate assigned values 410 (in FIG. 4, only a few of assigned values 410 are labeled for the sake of clarity). In an embodiment, thresholding module 430 may assign, to each of the neighbor pixels of the individual pixel, a value of 0 or 1 based on a comparison of each of neighboring pixel values 403 to threshold 408 for the individual pixel to generate assigned values 410. For example, if the neighboring pixel value is greater than threshold 408, a value of 1 may be assigned and otherwise a value of 0 may be assigned. For example, neighboring pixel values 403 may be compared to threshold 408 such that if $x_i$>T, assign 1, otherwise assign 0, where $x_i$ may be the neighboring pixel values 403 (e.g., $x_1$, $x_2$, ..., $x_8$) and T may be threshold 408.

Also as shown, binary coded image module 102, via sequencing module 430, may arrange or sequence assigned values 410 based on a direction 411. In the illustrated example, sequencing module 430 may arrange assigned values 410 in a clockwise manner beginning at an upper left most assigned value 410a (e.g., beginning at an upper left location and moving right until upper left most assigned value 410a is reached) and continuing until a last assigned value 410b is reached. In an embodiment, sequencing module 430 may arrange assigned values 410 in a clockwise manner beginning at the upper left most assigned value, completing outer assigned values, and continuing inwardly until the last assigned value is reached (see, e.g., FIGS. 2D and 2E where edge assigned values of the illustrated windows may be completed before going inwardly from the 5 by 5 edge to the 3 by 3 edge and so on). In the illustrated example, sequencing module 430 may begin at the neighboring pixel centered along the top edge of the window of assigned values 410 (e.g., assigned value 410a; a value of 0) and continue in a clockwise manner to generate binary coded representation 412. As discussed, in some examples, binary coded representation 412 may include 8-bits based on the number of neighboring pixels. Binary coded representation 412 may include any number of bits such as 4, 8, 12, any number of bits in the range of 4-12, or more, depending on the number of neighboring pixels evaluated.

As shown in FIG. 4, binary coded image module 102 may transfer binary coded representation 412 to object detection module 104 (please refer to FIG. 1). Binary coded image module 102 may determine binary coded representations as described for some, a majority, or all of the pixels associated with input image 101. For example, binary coded image module 102 may scan or loop over input image 101 to encode pixels with a binary coded representations to generate binary coded image 107.

Returning to FIG. 1, object detection module 104 may receive binary coded image 107. Also as shown, object detection model module 103 may provide an object detection model 108 to object detection module 104. For example, object detection model module 103 may be implemented or stored via a memory of system 100 and object detection model module 103 may include one or more native object detection models such as one or more binary coded image based object detection models. For example, object detection models may be stored in on-chip memory or preloaded into cache or the like.

Object detection model 108 may include any suitable data structure or framework for implementing a binary coded image based object detection model. In some examples, object detection model 108 may be implemented by multiple look up tables each associated with pixel coordinates (e.g., of select or targeted pixels used for the object detection) within a scan window of input image 101. In some examples, object detection model 108 may be implemented via a single look up for each selected or targeted pixel of binary coded image 107 such that each look up table includes confidence values indexed by binary coded representations. In other examples, object detection model 108 may be implemented by two or more nested look up tables with each nest of tables provided for each for each selected or targeted pixel of binary coded image 107. Furthermore, as is discussed further herein, object detection model 108 may provide a cascade based model such that portions of object detection model 108 are associated with a first stage of the cascade, portions are for a second stage, and so on.

For example, object detection model 108 may be a pretrained object detection model that is generated prior to implementation by system 100 either via system 100 or via another device such that object detection model 108 is transferred to system 100 via any suitable communications technique. Object detection model 108 may be associated with any suitable object such as a human face, a hand, a body, an automobile, or the like. For example, object detection model 108 may represent an object that is vertically aligned, 30 degree offset, 45 degree offset, 60 degree offset or the like. Furthermore, object detection model 108 may be provided in any orientation or spatial correlation with respect to input image 101. As is discussed further herein, object detection model 108 and binary coded image 107 may have a spatial correlation or spatial correlation mapping therebetween. Object detection may be applied based on such a spatial correlation mapping and subsequently, one or both of binary coded image 107 and object detection model 108 may be modified or adjusted to provide a different spatial correlation mapping. Object detection may be applied based on the new spatial correlation mapping. Such a process may be repeated for any number of spatial correlation mappings between object detection model 108 and binary coded image 107.

Furthermore, object detection model module 103 may store any number of object detection models including object detection model 108. For example, object detection model module 103 may store tens of models or hundreds of models for various object detections (e.g., one or more faces, one or more face orientations, hands, objects, or the like). As discussed herein, one or more of such models may be used to generate further models on the fly, which may thereby provide a limited memory footprint for object detection model module 103 and/or for additional object detections based on the models stored via object detection model module 103.

As shown in FIG. 1, object detection module 104 may include spatial correlation module 105, which may modify or adjust one or both of binary coded image 107 (or portions thereof) and object detection model 108 to provide adjusted binary coded image (BCI') 109 and/or adjusted object detection model (ODM') 110. Such adjustments (or no adjustment in some cases) may provide for a spatial correlation 111 between the binary coded image (e.g., binary coded image 107) and the object detection model (e.g., object detection model 108). In some examples, no changes may be made to binary coded image 107 and/or object detection model 108 and, in such cases, binary coded image 107 and object detection model 108 may be provided to multi-stage cascade classifier 106. As discussed, in other examples, binary coded image 107 and/or object detection model 108 may be adjusted or modified to provide a different spatial correlation 111 between the binary coded image and the object detection model. Such adjustments may provide additional models for evaluation by multi-stage cascade classifier 106 without additional storage and/or access requirements to memory storing object detection model module 103 for example. Prior to discussion of spatial correlation module 105 and the techniques associated therewith, the operation of multi-stage cascade classifier 106 is discussed.

Figure 5:
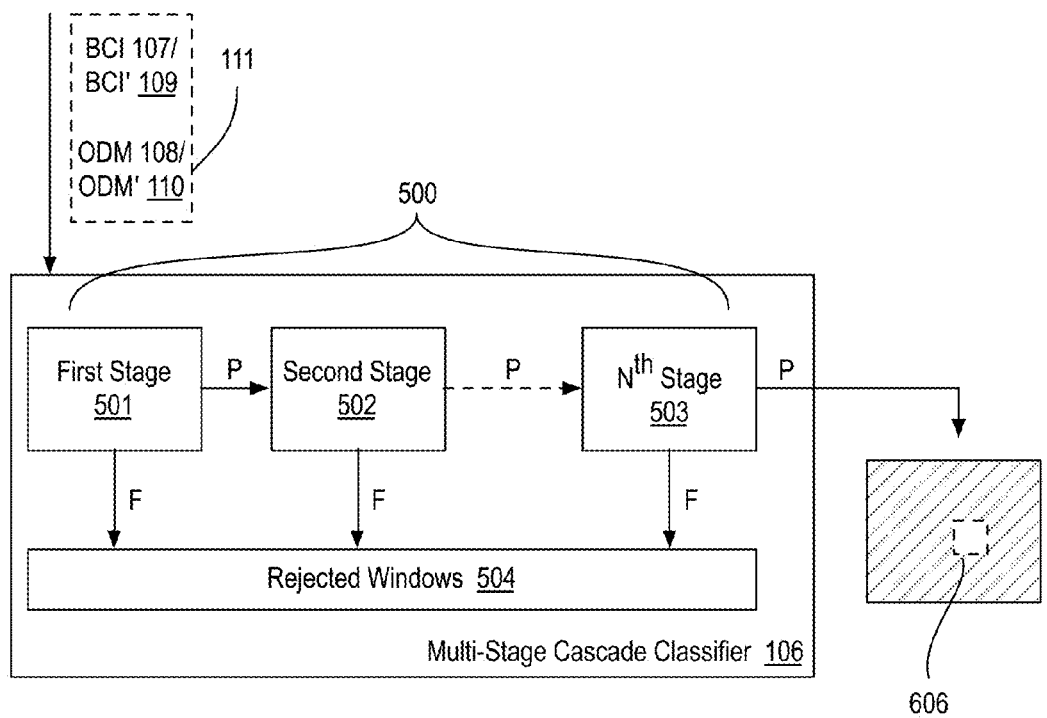
FIG. 5 illustrates an example multi-stage cascade classifier.

FIG. 5 illustrates an example multi-stage cascade classifier 106, arranged in accordance with at least some implementations of the present disclosure. Multi-stage cascade classifier 106 may perform object detection on input image 101 by applying a multi-stage cascade classifier to binary coded image 107 and/or adjusted binary coded image 109 based on object detection model 108 and/or adjusted object detection model 110. Such binary coded images and object detection models may have spatial correlation 111 between them as discussed herein. As shown, multi-stage cascade classifier 106 may include multiple stages 500 such as first stage 501, second stage 502, and N$^{th}$ Stage 503. Furthermore, multi-stage cascade classifier 106 may include a rejected windows module 504 for discarded scan windows (e.g., scan windows that do not pass a stage of multiple stages 500). Multiple stages 500 may include any suitable number of stages for evaluating classifiers for a region of an image to determine a candidate region. In an embodiment, multiple stages 500 include 4 to 12 stages. For example, the number of stages may be determined based on a size and quality of a training set used to establish the stages. Multi-stage cascade classifier 106 may be iteratively applied to multiple scan windows of input image 101 to generate an object detection candidate region 606 for example.

Figure 6:
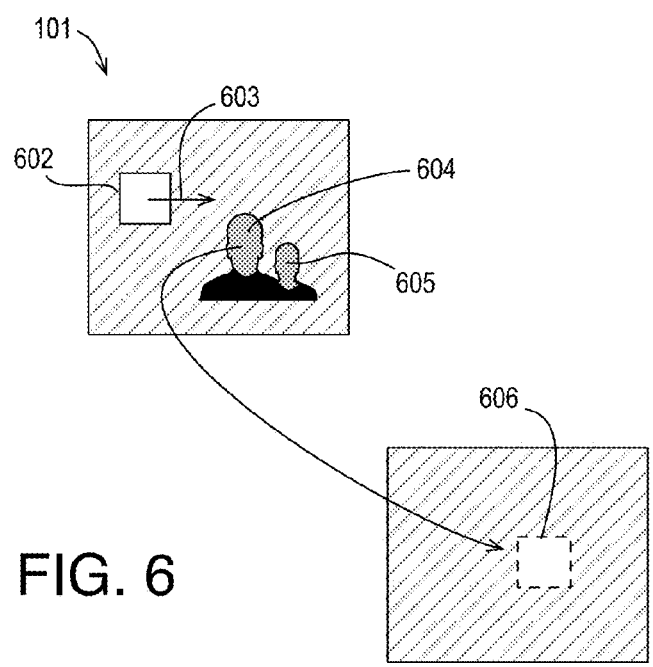
FIG. 6 illustrates an example input image and an example object detection candidate region.

For example, FIG. 6 illustrates an example input image 101 and an example object detection candidate region 606 (e.g., a passing scan window), arranged in accordance with at least some implementations of the present disclosure. As shown, a scan window 602 may be established within input image 101. Scan window 602 may scan across (e.g., in direction 603) and down input image 101 such that binary coded images (e.g., binary coded image 107 and/or adjusted binary coded image 109) may be evaluated within scan window 602 (e.g. based on object detection model 108 and/or adjusted object detection model 110). For example, scan window 602 may scan from the top left of input image 101 left to right, back to the left and down and across and so on, although embodiments herein are not limited to a particular scanning pattern. In an embodiment, scan window 602 may be evaluated and then may move one pixel or two pixels or the like for a next evaluation and so on such that many evaluations may be performed for input image 101 for the object detection model currently being evaluated. Furthermore, such scanning may be repeated for multiple object detection model/binary coded image spatial correlations as discussed herein or such object detection model/binary coded image spatial correlations may be evaluated at each scan window position before the scan window moves to a next position. Scan window 602 may have any size such as 32 by 32 pixels, for example.

Returning to FIG. 5, scan window 602 may be evaluated at first stage 501 for a particular spatial correlation and object detection model. If scan window 602 passes first stage 501 (indicated via "P"), it may be transferred to second stage 502. If scan window 602 passes second stage 502, it may be passed along to a third stage and so on. If scan window 602 passes all stages (e.g., through Nth stage 503) for the particular spatial correlation and object detection model, it may be saved or reserved as candidate region 606 (e.g., candidate region 606 may be stored in memory, displayed to a user, transferred for further processing, or the like). As shown, if scan window 602 fails any of multiple stages 500, it may be discarded via rejected windows module 504 (e.g., discarded as unlikely to contain the object of interest such as a face). For example, referring to FIG. 6, candidate region 606 may be a passing scan window associated with an image feature 604 (e.g., a human face). FIG. 6 also illustrates an image feature 605 (e.g., a human face). In some examples, image feature 605 may not be detected via scan window 602 but may be detected in a subsequent resizing the input image (e.g., image feature 605 may be too small to be detected by scan window at a current scaling but may be detected at a different scaling factor).

As discussed, multi-stage cascade classifier 106 may provide multiple stages 500. In some examples, evaluating each of multiple stages 500 during a detection phase may include determining confidence values implemented via look up tables (LUTs) for individual pixels of scan window 602.

Figure 7:
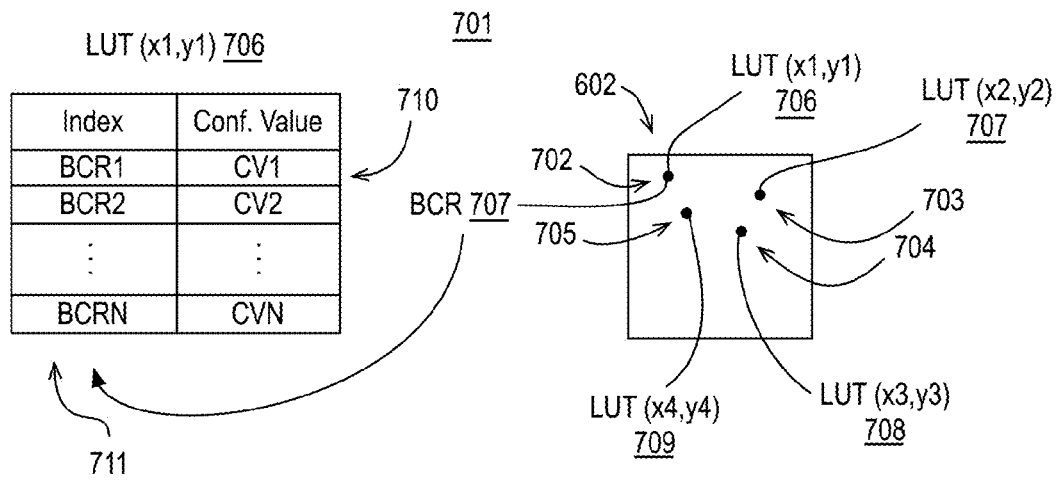
FIG. 7 illustrates example look up table correlations for an example object detection model and an example look up table for one individual pixel location.

FIG. 7 illustrates example look up table correlations for an example object detection model 701 and an example look up table for one individual pixel location, arranged in accordance with at least some implementations of the present disclosure. As shown, object detection model 701 may include (e.g., for a stage of a multi-stage classifier) look up tables 706-709 associated with pixel positions of pixels 702-705. Each pixel position may be determined by pixel coordinates of look up tables 706-709 for example. In the illustrated example, four pixel positions are presented for the sake of clarity of presentation. However, any number of pixel positions may be used. Furthermore, the number of pixel positions may increase for subsequent stages of multi-stage cascade classifier 106 (please refer to FIG. 5). For example, first stage 501 may have 16 to 20 pixel positions, second stage 502 may have 25 to 40 pixel positions and subsequent stages may have 60, 100, 200 or more pixel positions. Such number of pixel positions may be determined in a training phase of object detection model 701 as discussed herein.

As discussed, object detection model 701 may include look up tables 706-709 associated with pixel positions of pixels 702-705. For example, look up table 706 may be associated with a pixel position (x1, y1), look up table 707 may be associated with a pixel position (x2, y2), look up table 708 may be associated with a pixel position (x3, y3), and look up table 709 may be associated with a pixel position (x4, y4). Also as shown, pixel positions may be associated with pixels (e.g., (x1, y1) may be associated with pixel 702, (x2, y2) may be associated with pixel 703, (x3, y3) may be associated with pixel 704, and (x4, y4) may be associated with pixel 705), which may have pixel values, associated neighboring pixel values, and binary coded representation values as discussed herein. For example, the pixel positions of object detection model 701 may be used to determine binary coded representation values (e.g., from binary coded image 107 based on the current pixel values and neighboring pixel values for the pixel position) associated with the pixel positions. Such binary coded representation values may be used to evaluate scan window 602 based on object detection model 701.

FIG. 7 also illustrates example look up table 706 associated with pixel position (x1, y1). As shown, look up table 706 may include confidence values 710 (e.g., CV1-CVN) indexed by binary coded representations 711 (e.g., BCR1-BCRN). As discussed herein, binary coded representations may be determined for each of pixels 702-705. Based on the binary coded representation a confidence value may be determined based on the associated look up table. For example, if the binary coded representation for pixel 702 is BCR2, the confidence value for pixel 702 would be CV2. For pixel 703, look up table 707 would be accessed to determine the confidence value, for pixel 704, look up table 708 would be accessed to determine the confidence value, and for pixel 705, look up table 709 would be accessed to determine the confidence value. Look up tables 707-709 may be implemented in a manner similar to that of look up table 706. As shown, in some examples, look up tables 707-709 may be implemented as single look up tables. In other examples, look up tables 707-709 may be implemented as nested look up tables as discussed further herein. The confidence values for each pixel position being evaluated for the current stage may then be summed and compared to a predetermined threshold. If the summation is greater than the threshold, the scan window may pass the current stage and, if not, the scan window may fail the current stage.

For example, a stage of multi-stage cascade classifier 106 may be evaluated as shown in Expression (2):

$$CV_i = LUT(BRC_i) \quad (2)$$

$$\sum_i CV_i > TH$$

where $CV_i$ may be a confidence value for a pixel position i, i may be a counter that counts through all target pixel positions, LUT may be a look up table access, $BRC_i$ may be a binary coded representation, and TH may be a predetermined threshold.

As shown in Expressions (2), for each of multiple target positions in a region (e.g., a scan window or the like) of an input image, a summation of confidence values determined via a look up table. The confidence values may be provided via a single look up table for each pixel position (e.g., as shown in FIG. 7) or multiple nested look up table structures may be used as is discussed further herein. The summation of confidence may be compared to the predetermined threshold such that if the summation is greater than the threshold, the scan window (or region or the like) passes the classifier stage and otherwise the scan window is rejected (please refer to FIG. 6). In some examples, for object detection model 701, the pixel positions, confidence values, and threshold may be determined in a training phase.

In an embodiment, the above classification for a stage of multiple stages 500 may be applied or performed (e.g., in an object detection phase) as follows. For each position $x_i$ (e.g., each stage may use several positions) in a scan window, the value of the binary coded image may be determined (e.g., a binary coded representation ranging from 0 to 255). For each position, a separate look up table or separate nested look up table structure may be accessed to determine a confidence value based on the binary coded representation. The look up table values (e.g., confidence values) may be summed for all locations and the summation may be compared to the predetermined and/or pre-trained threshold. If the scan window passes (e.g., the sum of look up table values is greater than the threshold), it passes the stage, otherwise it fails the stage and is rejected to rejected windows module 504 (please refer to FIG. 5).

Returning to FIG. 1, as discussed, adjustments may be made to binary coded image 107 and/or object detection model 108 to modify a spatial correlation between the binary coded image and the object detection model. For example, FIG. 7 illustrates object detection model 701 being applied to scan window 602 based on a spatial correlation mapping. In the example of FIG. 7, object detection model 701 may have any suitable orientation (e.g., vertically aligned, offset by 30 degrees clockwise or counterclockwise, or the like) and scan window 602 may be aligned with input image 101 and binary coded image 107 without modification. As is discussed further herein, object detection may be performed based on other spatial correlation mappings (e.g., spatial correlation 111) between binary coded image 101 and object detection model 108.

In an example, object detection model 108 may be modified or adjusted to generate adjusted object detection model 110. For example, pixel coordinates for look up tables may be modified for object detection model 108 to generate adjusted object detection model 110 such that different pixels (e.g., providing a 90 degree rotation or mirroring) of scan window 602 are evaluated for additional spatial correlation mappings. Furthermore, in such examples, binary coded representations may be determine for such adjusted pixel coordinates and, prior to accessing the associated look up table, such binary coded representations may be modified or adjusted via bit shifting such that adjusted binary coded image 109 may be generated from object detection model 107. Adjusted binary coded image 109 may be generated all at once from binary coded image 107 to provide such an additional spatial correlation mapping or only portions of adjusted binary coded image 109 may be generated as needed for evaluation based on adjusted object detection model 110. Such techniques may be applied to provide for a variety of spatial correlation mappings between the binary coded image and the object detection model available via object detection model module 103.

Figure 8:
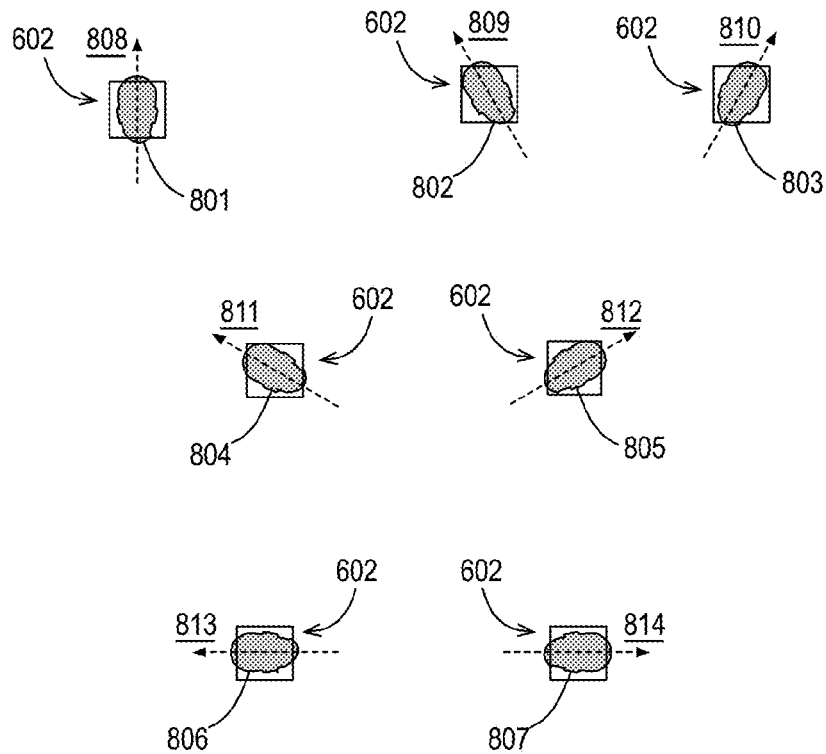
FIG. 8 is a diagram illustrating example spatial correlations between object detection models and binary coded images.

FIG. 8 is a diagram illustrating example spatial correlations between object detection models and binary coded images, arranged in accordance with at least some implementations of the present disclosure. In FIG. 8, object detection models 801-807 (e.g., facial models) are illustrated as pictorial faces for ease of presentation. In various embodiments, an object detection model (e.g., as implemented via multi-stage cascade classifier 106 and look up tables and the like) may be provided based on the illustrated object detection models 801-807. As shown in FIG. 8, scan window 602 may be provided with respect to object detection models 801-807. In the example of FIG. 8, scan window 602 is provided in the same direction (e.g., vertically aligned with input image 101 and binary coded image 107 as shown in FIG. 6) in each instance of scan window 602.

As shown, object detection model 801 may have an alignment direction 808 that is vertically aligned (e.g., the face of object detection model 801 is provided head-on) with respect to scan window 602. Object detection model 802 may have an alignment direction 809 that is 30 degrees counterclockwise rotated with respect to scan window 602. Object detection model 803 may have an alignment direction 810 that is 30 degrees clockwise rotated with respect to scan window 602. Object detection model 804 may have an alignment direction 811 that is 60 degrees counterclockwise rotated with respect to scan window 602. Object detection model 805 may have an alignment direction 812 that is 60 degrees clockwise rotated with respect to scan window 602. Object detection model 806 may have an alignment direction 813 that is 90 degrees counterclockwise rotated with respect to scan window 602. Object detection model 807 may have an alignment direction 814 that is 90 degrees clockwise rotated with respect to scan window 602.

As is discussed herein, the illustrated spatial correlations between object detection models 801-807 and scan window 602 (e.g., 7 orientations) may be provided based on two native or preloaded or pretrained or the like object detection models (e.g., a vertically aligned model and a 30 degree offset model or the like). Multiple spatial correlation mappings between object detection models 801-807 and scan window 602 may be generated or provided based on adjusting the object detection model and/or binary coded image as discussed herein. For example, object detection model 801 and object detection model 802 may be provided via object detection model module 103 (e.g., they may be native or pretrained object detection models). Object detection models 801,802 may be applied to scan window 602 as discussed herein to provide object detection. In such examples, the spatial correlation mapping may include no change to the object detection model and no change to the binary coded image.

Other object detection models 803-807 (and still others if desired) may be generated based on object detection models 801, 802 by modifying or adjusting the pixel coordinates associated with the look up tables of object detection models 801, 802 and by changing the bit orders of the binary coded representations associated with the adjusted pixel coordinates. For example, the symmetrical neighboring pixel patterns and pixel weight values discussed herein may provide properties that allow for rotating or mirroring or otherwise deriving adjusted binary coded representations for pixels based on original binary coded representation values. FIG. 10 provides example adjustments of pixel coordinates for lookup tables of object detection models and FIG. 9 provides example changes in bit orders of binary coded representations.

Figure 9:
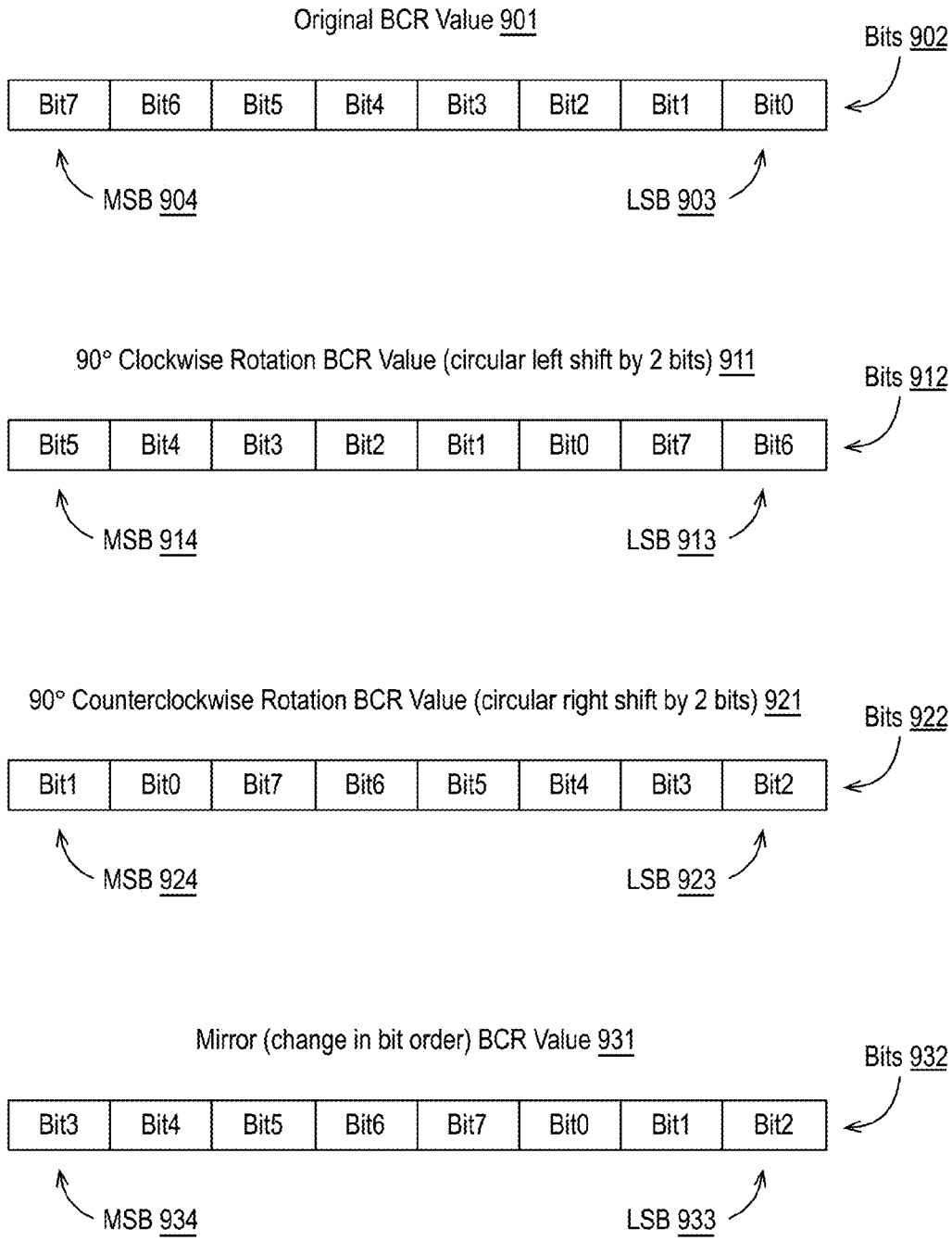
FIG. 9 illustrates example binary coded representation transforms.
Figure 10:
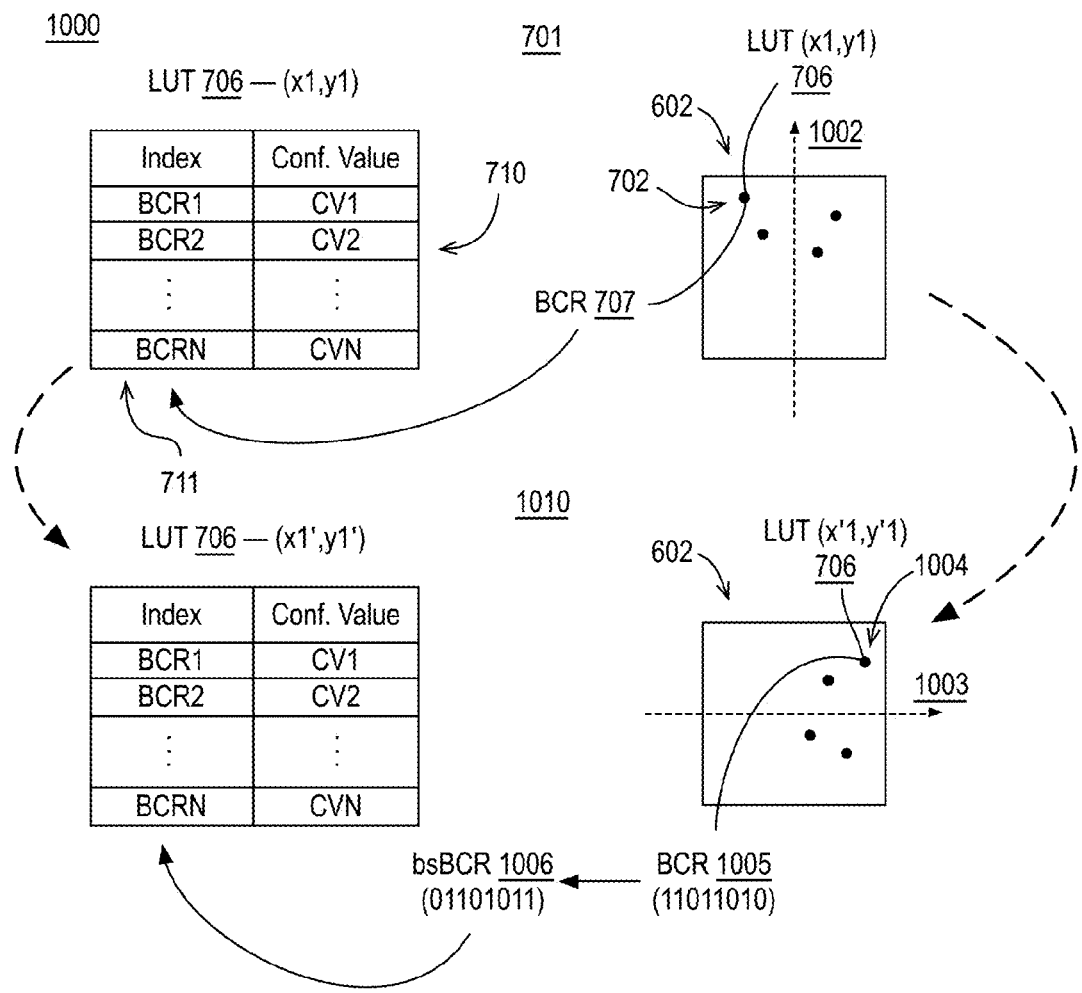
FIG. 10 is a diagram illustrating an example process for modifying an object detection model to generate an object detection model having a different spatial correlation mapping.

FIG. 9 illustrates example binary coded representation transforms, arranged in accordance with at least some implementations of the present disclosure. As shown, an original binary coded representation (BCR) value 901 may be provided. For example, original binary coded representation value 901 may be determined based on an assumed vertical orientation or alignment of input image 101 and original binary coded representation (BCR) value 901 may be generated as discussed herein with respect to FIGS. 2-4. For example, original binary coded representation value 901 may be any binary coded representation value generated based on neighboring pixel data, generated during a training phase of multi-stage cascade classifier 106, or a previously transformed binary coded representation value. As shown, original binary coded representation value 901 may include bits 902 illustrated as Bit0, Bit1, Bit2, Bit3, Bit4, Bit5, Bit6, and Bit7 in the order Bit7-Bit6-Bit5-Bit4-Bit3-Bit2-Bit1-Bit0 with Bit0 being a least significant bit (LSB) 903 and Bit7 being a most significant bit (MSB) 904.

As discussed, to evaluate additional spatial orientations between a binary coded image and an object detection model, the object detection model may be modified to target different pixels (e.g., based on changes to pixel coordinates associated with look up tables). Such modification may cause a change in spatial correlation between the binary coded image and the object detection model such as a 90 degree rotation or mirroring or the like. In such examples, at the modified pixel coordinates, the binary coded representation may also be adjusted to provide the proper orientation between the binary coded image and the object detection model based on the adjusted spatial correlation. For example, original binary coded representation (BCR) value 901 may be bit shifted to provide the proper orientation as shown based on a 90 degree clockwise rotation, a 90 degree counterclockwise rotation, or a mirroring. In some examples, multiple such bit shifting may be performed to provide the proper orientation.

For example, to provide a 90 degree clockwise rotation of the object detection model, original binary coded representation value 901 may be bit shifted to provide a 90 degree clockwise rotation to generate 90 degree clockwise rotation binary coded representation value (BCR) 911. For example, as shown, original binary coded representation value 901 may be transformed to generate 90 degree clockwise rotation binary coded representation value 911 by circular left shifting by 2 bits to generate bits 912 from bits 902. As shown, 90 degree clockwise rotation binary coded representation value 911 may include bits 912 in the order illustrated as Bit5-Bit4-Bit3-Bit2-Bit1-Bit0-Bit7-Bit6 with Bit5 being a least significant bit (LSB) 913 and Bit5 being a most significant bit (MSB) 914.

In another example, to provide a 90 degree counterclockwise rotation of the object detection model, original binary coded representation value 901 may be bit shifted to provide a 90 degree counterclockwise rotation to generate 90 degree counterclockwise rotation binary coded representation value (BCR) 921. For example, original binary coded representation value 901 may be transformed to generate 90 degree counterclockwise rotation binary coded representation value (BCR) 921 by circular right shifting by 2 bits to generate bits 922 from bits 902. As shown, 90 degree counterclockwise rotation binary coded representation value 921 may include bits 922 in the order illustrated as Bit1-Bit0-Bit7-Bit6-Bit5-Bit4-Bit3-Bit2 with Bit2 being a least significant bit (LSB) 923 and Bit1 being a most significant bit (MSB) 924.

Furthermore, to provide a mirroring of the object detection model, original binary coded representation value 901 may be bit shifted to provide a mirroring to generate mirror binary coded representation value (BCR) 931. For example, original binary coded representation value 901 may be transformed to generate mirror binary coded representation value 931 via a change in bit order to generate bits 932 from bits 902. As shown, mirror binary coded representation value 931 may include bits 932 in the order illustrated as Bit3-Bit4-Bit5-Bit6-Bit7-Bit0-Bit1-Bit2 with Bit2 being a least significant bit (LSB) 933 and Bit3 being a most significant bit (MSB) 934.

As discussed, to generate the spatial correlations discussed with respect to FIG. 8, the transforms (e.g., one or more transforms) discussed with respect to FIG. 9 may be used to support multiple spatial correlations based on two native object detection models: a vertically aligned object detection model (e.g., object detection model 801) and a 30 degree counterclockwise offset object detection model (e.g., object detection model 802). For example, Table 1 provides example transforms and source binary coded representation values for generating adjusted binary coded representations to support example additional object detection models for evaluation (e.g., via multi-stage cascade classifier 106).

TABLE 1

Example Transforms and Source Representations for Generating Object Detection Models

| Model Name (degrees from vertical) | Transform | Derived From |
|---|---|---|
| 0 | N/A | N/A |
| 30 Counterclockwise | N/A | N/A |
| 30 Clockwise | Mirror | 30 Counterclockwise |
| 60 Counterclockwise | Rotate 90 degrees counterclockwise | 30 Clockwise |
| 60 Clockwise | Mirror | 60 Counterclockwise |
| 90 Counterclockwise | Rotate 90 degrees counterclockwise | 0 |
| 90 Clockwise | Rotate 90 degrees clockwise | 0 |

For example, as shown in Table 1 and with reference to FIG. 1, a vertically aligned model (e.g., model 0 in Table 1 and object detection model 801 in FIG. 8) and a 30 degree counterclockwise model (e.g., 30 Counterclockwise in Table 1 and object detection model 802 in FIG. 8) may be provided via, for example, object detection model module 103 as implemented via cache memory or the like. Such models may be provided to spatial correlation module 105 to generate additional models (e.g., a 30 degree clockwise model such as object detection model 803, a 60 degree counterclockwise model such as object detection model 804, a 60 degree clockwise model such as object detection model 805, a 90 degree counterclockwise model such as object detection model 806, and a 90 degree clockwise model such as object detection model 807; please refer to FIG. 8) via adjustment of pixel coordinates associated with look up tables as is discussed with respect to FIG. 10. Furthermore, based on the adjusted pixel coordinates, binary coded representations may be determined and bit shifted (e.g., one or more times) based on Table 1, for example, prior to accessing the appropriate look up table.

The adjustment in pixel coordinates and bit shifting of binary coded representation values at the adjusted pixel coordinates may work in conjunction to provide the additional model or additional spatial correlation between the binary coded image and the object detection model. For example, as shown in Table 1, the 30 degree clockwise model may be generated based on a mirror operation performed on the 30 degree counterclockwise model, the 60 degree counterclockwise model may be generated based on a rotate 90 degrees counterclockwise operation on the 30 degree counterclockwise model, the 60 degree clockwise model may be generated based on a mirror operation performed on the 60 degree counterclockwise model, the 90 degree counterclockwise model may be generated based on a rotate 90 degrees counterclockwise operation on the 0 degree model, and the 90 degree clockwise model may be generated based on a rotate 90 degrees clockwise operation on the 0 degree model. In implementing such adjusted models, corresponding bit shifts or adjustments may be made to binary coded representations of binary coded image 107 to implement the discussed spatial correlation mappings. Although discussed with respect to the described spatial relationships and models, any suitable spatial relationships may be generated using the techniques discussed herein.

FIG. 10 is a diagram illustrating an example process 1000 for modifying an object detection model 701 to generate an object detection model 1010 having a different spatial correlation mapping, arranged in accordance with at least some implementations of the present disclosure. As shown in FIG. 10 and as discussed with respect to FIG. 7, look up table 706 of object detection model 701 may be associated with a pixel position (x1, y1) (e.g., pixel 702 of scan window 602 in the example of FIG. 10). In the example of FIG. 10, only pixel 702 is labeled for the sake of clarity of presentation. Furthermore, look up table 706 may include confidence values CV1-CVN indexed by binary coded representations BCR1-BCRN. In other examples, confidence values may be determined via a nested look up table structure as discussed further herein.

Also as shown, object detection model 701 (e.g., an object detection model stored via object detection model module 103) may be transformed to generate object detection model 1010 having a different spatial correlation with respect to a binary coded image than that of object detection model 701. For example, object detection model 701 and scan window 602 (and thereby the associated binary coded image) may have a spatial correlation such as a vertically aligned spatial correlation mapping. In the example of FIG. 10, scan window 602 may be vertically aligned in both instances of scan window 602 (e.g., scan window 602 may not change in orientation). Furthermore, object detection model 701 may be vertically aligned as shown via alignment direction 1002. In such examples, object detection model 701 and scan window 602 (and thereby the associated binary coded image) may have a vertically aligned spatial correlation.

As shown, object detection model 1010 may be 90 degree clockwise rotated with respect to object detection model 701. As shown via alignment direction 1003, object detection model 1010 may be horizontally aligned and facing right. In such examples, object detection model 1010 and scan window 602 (and thereby the associated binary coded image) may have a 90 degree clockwise rotation therebetween. Furthermore, in such examples, object detection model 1010 and object detection model 701 may have a spatial relationship therebetween comprising a 90 degree clockwise rotation (e.g., object detection model 1010 is rotated 90 degrees clockwise with respect to object detection model 701). Although discussed with respect to a 90 degree clockwise rotation, object detection model 701 and object detection model 1010 may have any spatial relationship such as a 90 degree counterclockwise rotation or a mirror relationship.

To provide the discussed different spatial orientation mapping between object detection model 1010 and scan window 602 (and thereby the associated binary coded image) based on object detection model 701, object detection model 701 may be modified to generate object detection model 1010. For example, the pixel coordinates for look up tables of object detection model 1010 may be generated based on the pixel coordinates look up tables of object detection model 706. In the example of FIG. 10, pixel coordinate of look up table 706 may be adjusted to pixel coordinates (x1', y1'). Furthermore, in an implementation phase, a binary coded representation 1005 may be determined for pixel 1004 (e.g. based on pixel coordinates (x1', y1'). Prior to accessing look up table 706, binary coded representation 1005 may be bit shifted to generate bit shifted binary coded representation 1006. Look up table 706 may be accessed based on bit shifted binary coded representation 1006 to determine a confidence value for object detection as discussed herein. For example, for the 90 degree clockwise rotation, Pseudo-Code (1) may be followed to generate the adjusted pixel coordinates and bit shifted binary coded representations:

Pseudo-Code (1), Rotate 90 degrees Clockwise:
Bits Order 76543210→Bits Order 54321076
$x_{rot}$=det_win_size−1−y
$y_{rot}$=x
where the bits order prior to the arrow may represent BCR1-BCRN, the bits order after the arrow may represent aBCR1-aBCRN, x and y may represent the pixel coordinates prior to rotation (e.g., (x1, y1)), and $x_{rot}$ and $y_{rot}$ may represent the pixel coordinates after 90 degree clockwise rotation (e.g., (x1', y1')).

In the illustrated example, the 90 degree clockwise rotation may cause binary coded representation 1005 (e.g., 11011010) to adjust to bit shifted binary coded representation 1006 (e.g., 01101011) based on Pseudo-Code (1).

As discussed, a 90 degree clockwise rotation may be provided between object detection model 701 and object detection model 1010. In other examples, a 90 degree counterclockwise rotation or a mirror operation may be provided. For example, for the 90 degree clockwise rotation, Pseudo-Code (2) may be followed to generate the adjusted pixel coordinates and the bit shifted binary coded representations:

Pseudo-Code (2), Rotate 90 degrees Counterclockwise:
Bits Order 76543210→Bits Order 10765432
$x_{rot}$=y
$y_{rot}$=det_win_size−1−x
where the bits order prior to the arrow may represent BCR1-BCRN, the bits order after the arrow may represent aBCR1-aBCRN, x and y may represent the pixel coordinates prior to rotation (e.g., (x1, y1)), and $x_{rot}$ and $y_{rot}$ may represent the pixel coordinates after 90 degree counterclockwise rotation.

Furthermore, Pseudo-Code (3) may be followed to generate the adjusted pixel coordinates and the bit shifted binary coded representations:

Pseudo-Code (3), Mirror:
Bits Order 76543210→Bits Order 34567012
$x_{mirror}$=det_win_width−1−x
$y_{mirror}$=y
where the bits order prior to the arrow may represent BCR1-BCRN, the bits order after the arrow may represent aBCR1-aBCRN, x and y may represent the pixel coordinates prior to the mirror operation (e.g., (x1, y1)), and $x_{mirror}$ and $y_{mirror}$ may represent the pixel coordinates after the mirror operation.

Furthermore, multiple pixel coordinate adjustments and bit shifts may be implemented to provide the adjusted spatial correlation mappings. For example, single adjustments or multiple adjustments may be used as described in FIG. 1. For example, a vertically aligned model may be transformed by Pseudo-Code (1) to generate a 90 degree clockwise model, a vertically aligned model may be transformed by Pseudo-Code (2) to generate a 90 degree counterclockwise model, a 30 degree counterclockwise model may be transformed by Pseudo-Code (3) to generate a 30 degree clockwise model, a 30 degree counterclockwise model may be transformed by Pseudo-Code (3) and Pseudo-Code (2) to generate a 60 degree counterclockwise model, and a 30 degree counterclockwise model may be transformed by Pseudo-Code (3), Pseudo-Code (2), and Pseudo-Code (3) to generate a 60 degree counterclockwise model.

As discussed, in some examples, object detection model pixel coordinates for the look up tables and binary coded representations may be adjusted or modified to provide a second spatial correlation mapping from a first spatial correlation mapping between an object detection model and a binary coded image based object detection model. In other examples, object detection model pixel coordinates and indexing values for the look up tables may be adjusted or modified to provide a second spatial correlation mapping from a first spatial correlation mapping between an object detection model and a binary coded image based object detection model. For example, binary coded representation values 711 may be adjusted for look up table 706 to provide the adjusted or modified spatial correlation mapping. For example, bit shifts opposite to those illustrated in FIG. 9 may be implemented to provide the adjusted or modified spatial correlation mapping.

Returning to FIG. 1, such modifications of binary coded image based object detection models and/or binary coded images may be implemented via spatial correlation module 105 to generate adjusted binary coded image 109 and/or adjusted object detection model 110. Such adjusted binary coded image 109 and/or adjusted object detection model 110 may be used as discussed herein to perform object detection via multi-stage cascade classifier 106. For example, any number of spatial correlation mappings between binary coded image 107 and object detection model 108 may be implemented via spatial correlation module 105 and tested for object detection via multi-stage cascade classifier 106.

As discussed, in some examples, object detection model compression may be achieved by training only a limited number of native models based on symmetrical binary coded image based techniques. In other examples, redundancy in the model may be removed by grouping based on binary coded representation values. For example, the sizes of the look up tables (e.g. look up tables 706-709) may be reduced by grouping binary coded representations at each target pixel coordinate. For example, look up table 706 may be represented by 256 bytes (e.g., 256 confidence value entries of 1 byte each) in a single look up table structure. Such a look up table structure may be treated as 256 groups with the confidence value of each group represented by 1 byte. In the embodiments discussed herein, number of groups may be reduced and the bit precision of the confidence values may be increased. The motivation for such grouping may be based on an example binary coded representation being an 8 bit integer value. Such 8 bit integer values may represent 256 image patch patterns or the like. However, such granularity of 256 patterns may not be needed in many implementations.

FIG. 11 illustrates example object detection patch patterns 1100, arranged in accordance with at least some implementations of the present disclosure. As shown in FIG. 11, patch patterns 1100 may include patch patterns 1101-1108. In the example of FIG. 11, patch patterns 1101-1108 may, with varying degrees of accuracy, attempt to represent a 45 degree edge for an object detection model. To represent a 45 degree edge, 6 patterns may be used including patch patterns 1101, 1102, 1103 (and three that are not shown including a) a patch pattern with only the bottom right block as a white block with the rest being black, b) a patch pattern with the three bottom right blocks as white with the rest being black, and c) a patch pattern with the five bottom right blocks as white with the rest being black). Continuing the 45 degree edge example, all other 250 patch patterns may be grouped with one of the 6 patch patterns (e.g., patch patterns 1101, 1102, 1103 as illustrated and the described patch patterns a), b), c)) or with an irrelevant grouping.

FIG. 11 illustrates example groupings such that patch pattern 1104 is grouped with patch pattern 1101, patch pattern 1105 is grouped with patch pattern 1102, and patch pattern 1106 is grouped with patch pattern 1103. For example, such patch pattern groupings (and others) may be provided with the same confidence values. Furthermore, FIG. 11 illustrates example patch patterns 1107, 1108 that, for a 45 degree patch pattern detection may be put into an irrelevant group (e.g., a group having a low or zero confidence value). As discussed, such groupings may provide for shared confidence values, which may reduce overall size of the implemented look up tables. Such groupings may be provided for any suitable patterns such as edge or line detections or the like.

Figure 12:
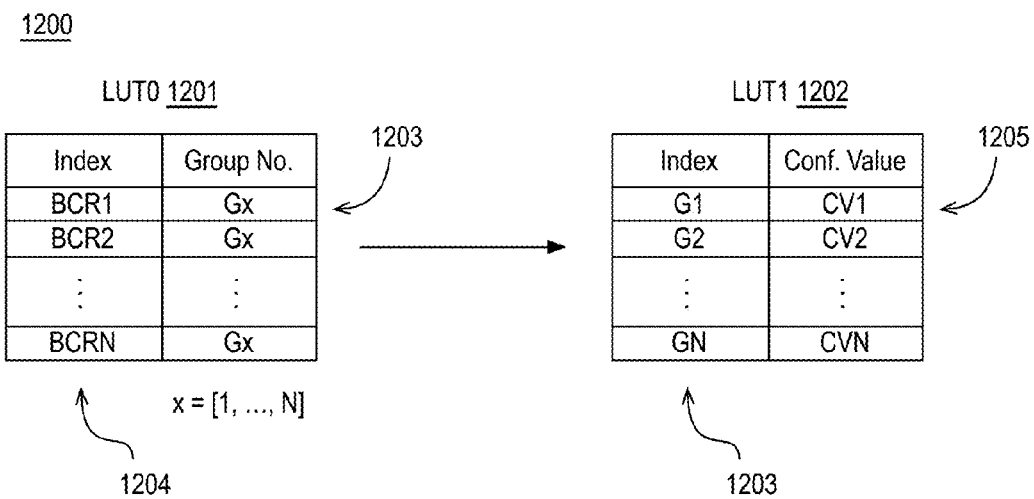
FIG. 12 illustrates an example look up table structure.

FIG. 12 illustrates an example look up table structure 1200, arranged in accordance with at least some implementations of the present disclosure. As shown in FIG. 12, look up table structure 1200 may provide nested look up tables 1201, 1202. Such look up tables 1201, 1202 may be generated and populated during a training phase and accessed during an implementation phase of multi-stage cascade classifier 106 for example.

As shown, look up table 1201 may include group numbers 1203 indexed by binary coded representation values 1204 and look up table 1202 may include confidence values 1205 indexed by group numbers 1203. As shown, any number of group numbers (e.g., N) may be used in look up table structure 1200. For example, N may be 4 or 8 or 16 or the like. Furthermore, group numbers 1203 may be populated into look up table 1201 according to a training of associated object detection model (e.g., binary coded representations 1204 may be provided as an index sequentially in look up table 1201 and mapped to the appropriate group number of group numbers 1203). Furthermore, in look up table 1202, group numbers 1203 may be provided sequentially and mapped to the appropriate confidence value of confidence value 1205.

In an implementation phase of look up table structure 1200, a binary coded representation may be received and look up table 1201 may be accessed to determine a group number associated with the binary coded representation. Look up table 1202 may then be accessed based on the group number to determine a confidence value associated with the binary coded representation. The confidence value may be used for evaluation of a scan window or the like as discussed herein. In the illustrated example, two look up tables are provided in a nested structure with look up table 1202 indexed based on group numbers 1203.

However, any number of nested look up tables such as three or four nested look up tables may be used. For example, look up table 1201 may include first group numbers indexed by binary coded representation values, an intermittent look up table between look up table 1201 and look up table 1202 may include second group numbers indexed by the first group numbers, and look up table 1202 may include confidence values indexed by the second group numbers.

For example, implementation of multiple nested look up tables may save memory footprint as follows. Assuming 16 group numbers 1203 and two look up tables, a 256 byte single look up table may instead be provided via LUT0 that maps binary coded representation values to group numbers and LUT1 that maps group numbers to confidence values. In this example, LUT0 may have 256 entries with 4 bits per entry (as 16 group numbers may be represented with 4 bits) and LUT1 may have 16 entries with 8 bits per entry (e.g., assuming the confidence values are 8 bit integers).

During the detection phase, the confidence value at a point $x_t$ may be determined by two levels of look up tables as shown in Expression (3):

$$CV_t = LUT1(LUT0(\gamma))$$

where $CV_t$ may be the confidence value at point $x_t$, LUT1 may be an access of LUT1, LUT0 may be an access of LUT0, and $\gamma$ may be the binary coded representation value at $x_t$.

Such grouping may save memory resources as, continuing the above example of N=16, the nested look up tables may be represented by 256×4/8+1×16=144 bytes (e.g., 56.25% of the original 256 bytes). If N=*, the nested look up tables may be represented by 256×3/8+1×8=104 bytes (e.g., 40.62% of the original 256 bytes). As discussed, the nested look up tables may be defined and trained in a training phase. If the provided nested structure does not provide benefits (e.g., if N is greater than 16), a single look up table may be provided. As such, different look up table structures (e.g., single, two nested with N=8, two nested with N=16, three nested, or the like) may be provided for different pixels.

Furthermore, such nested look up tables may provide a structure for improved performance. For example, floating point numbers may be used for to represent confidence values 1205 for increased bit precision. In such examples, model size savings may still be attained. For example, if N=16, the nested look up tables may be represented by 256×4/8+16×size_of_float=192 bytes (e.g., 75% of the original 256 bytes). For example, any suitable number format may be used for confidence values 1205 such as 8 bit integer, U8, floating point, or the like.

Figure 13:
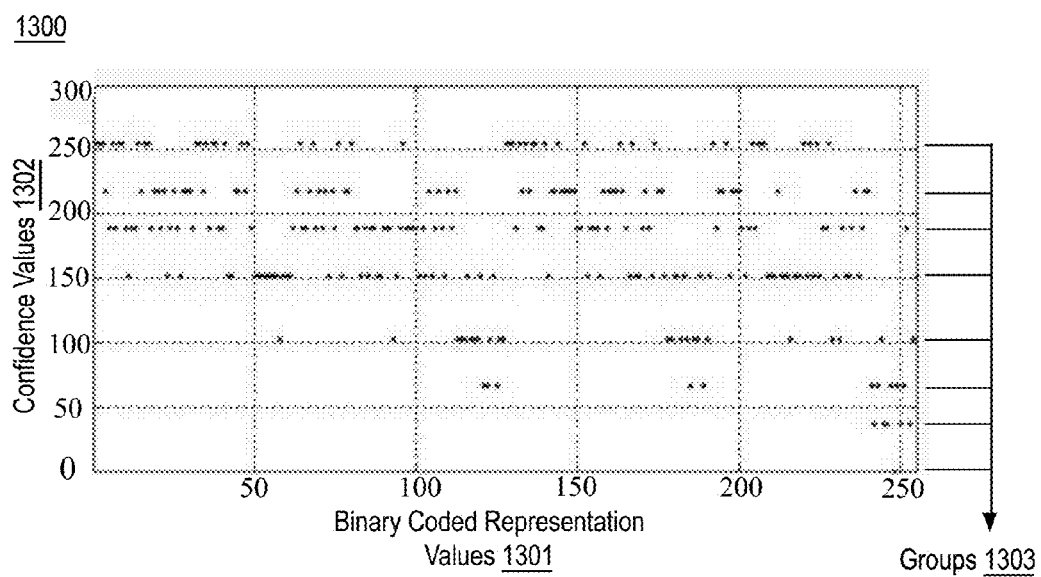
FIG. 13 illustrates a chart of example confidence values for example binary coded representation values.

FIG. 13 illustrates a chart 1300 of example confidence values for example binary coded representation values, arranged in accordance with at least some implementations of the present disclosure. As shown in FIG. 13, binary coded representation values 1301 may range from 0 to 256. In the example of chart 1300, binary coded representation values 1301 are grouped into eight (e.g., N=8) groups 1303. As shown, each group may correspond to a confidence value of confidence values 1302. For example, chart 1300 may be implemented via look up table 1201 and look up table 1202 as discussed with respect to FIG. 12 with look up table 1201 mapping binary coded representation values 1301 to groups 1303 and look up table 1202 mapping groups 1303 to confidence values 1302.

As discussed, the described techniques may provide model compression in binary coded image based object detection. For example, one or more object detection models may be stored via memory and additional object detection models may be evaluated based on transformation of the stored object detection models. Such object detection models may each be implemented via a multi-stage cascade classifier for a portion (e.g., a scan window of an input image). Furthermore, such models that may be evaluated for any number of scan windows of any number of scalings of an input image.

Figure 14:
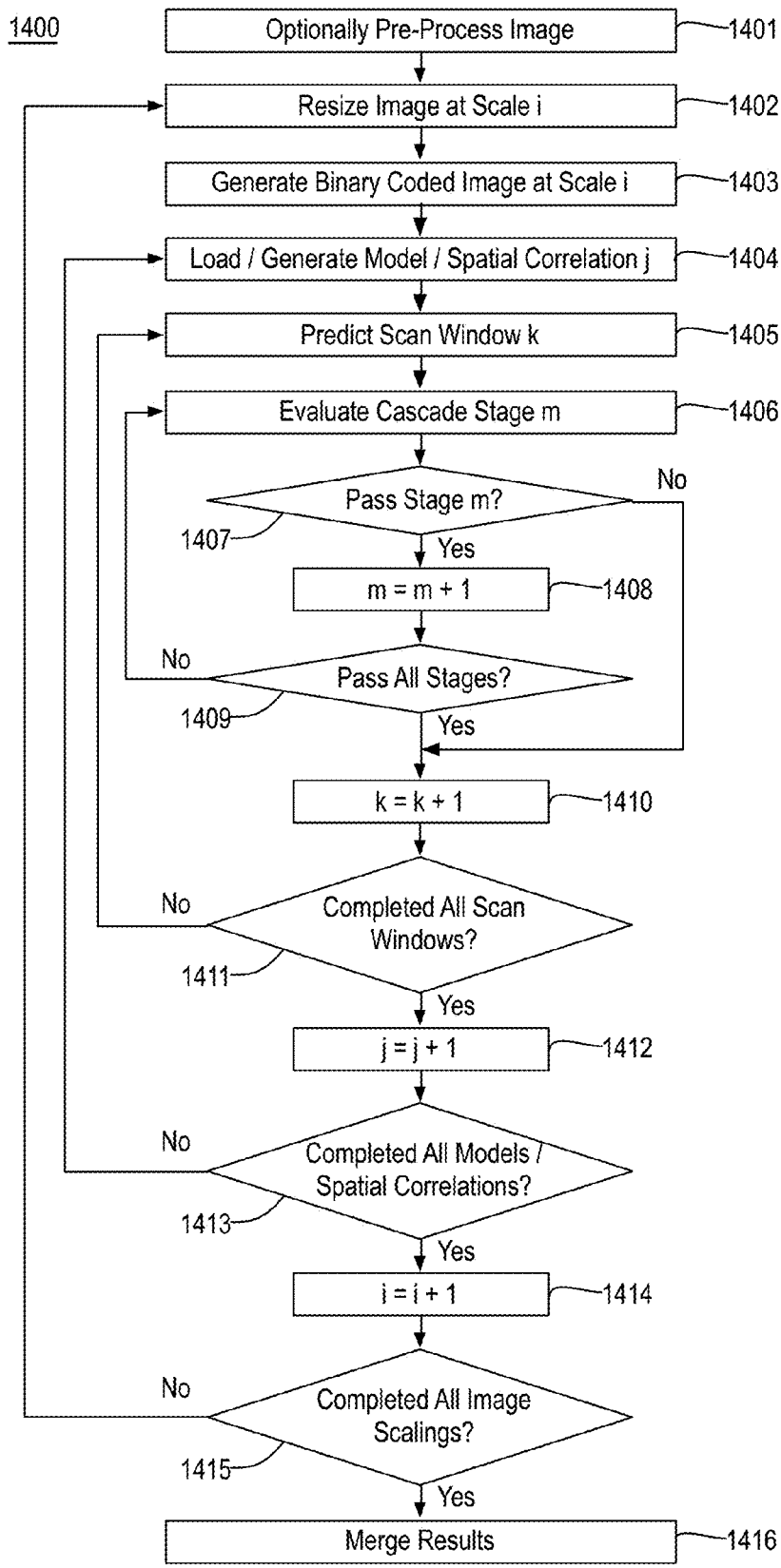
FIG. 14 is a flow diagram illustrating an example process for object detection.

FIG. 14 is a flow diagram illustrating an example process 1400 for object detection, arranged in accordance with at least some implementations of the present disclosure. Process 1400 may include one or more operations 1401-1416 as illustrated in FIG. 14. Process 1400 may form at least part of an object detection process. By way of non-limiting example, process 1400 may form at least part of an object detection process for one or more input images as undertaken by system 100 as discussed herein.

Process 1400 may begin at operation 1401, "Optionally Pre-Process Image", where an input image, target image, subject image or the like may be pre-processed. In an embodiment, the pre-processing may include converting the image from a color image to a gray scale image. The input image may include any image or image file such as, for example, a real-time image, a decoded image, a captured image (e.g., via a camera or the like), a rendered image, an image from a sequence of video images or frames, an image retrieved from memory, or the like. For example, a user or process (e.g., software process) may invoke process 1400 via system 100.

Process 1400 may continue at operation 1402, "Resize Image at Scale i", where the image may be resized at scale i (e.g., a counter variable). For example, in object detection it may be advantageous to inspect the image at various scaling sizes to detect within the image objects of different sizes. In an example, a scan window may have a predetermined size (e.g., 32 by 32 pixels) and the image may be scaled to a size compatible with scanning based on the size of the scan window. For example, the image may first be evaluated at its native size (e.g., no resizing may be performed) and subsequent iterations (e.g., from decision operation 813) may scale the image based on a scaling factor (e.g., 1.05, 1.1, 1.2, 1.5, or the like) and repeat the scaling until the image is scaled to the size of the scan window or a multiple of the scan window or the like. A smaller scale factor may provide more quality at the cost of reduced speed. In some examples, the scaling factor is kept constant at various iterations and in other examples it may be varied. In an embodiment, the image is a 1080p image and the scan window is 32 by 32 pixels.

Process 1400 may continue at operation 1403, "Generate Binary Coded Image at Scale i", where a binary coded image of the image at scale i (e.g. input image 101) as discussed herein may be generated. For example, binary coded image 107 may be generated as discussed herein.

Process 1400 may continue at operation 1404, "Load/Generate Model/Spatial Correlation j", where an object detection model and spatial correlation mapping j (e.g., a counter variable) may be loaded or generated. At subsequent iterations (e.g., from decision block 1411) another native object detection model may be loaded or another derived object detection model (e.g., having a different spatial correlation with respect to the scan windows) may be generated as discussed herein. For example, generating the derived object detection model may include adjusting pixel coordinates associating look up tables to positions within a scan window.

Process 1400 may continue at operation 1405, "Predict Scan Window k", where a scan window k (e.g., a counter variable) within the input image may be predicted or determined. For example, at a first iteration the scan window may be at a top left of the input image and at subsequent iterations (e.g., from decision operation 1411) the scan window may proceed by a number of pixels to the right until it reaches the right of the input image and then down by the number of pixels and back to the left of the image and so on until the entire input image has been scanned. For example, the number of pixels moved at each iteration may be 1 or 2 pixels or more such that many scan windows may be evaluated. A smaller movement of the scan window may provide higher quality at the cost of processing resources and time for example.

Process 1400 may continue at operation 1406, "Evaluate Cascade Stage m", where a cascade stage m (e.g., where m is a counter variable) may be evaluated. For example, a stage of multi-stage cascade classifier 106 may be evaluated for scan window k. In an embodiment, evaluating scan window k at stage m may include evaluating an object detection model having pixel location confidence value determinations implemented via two or more nested look up tables as discussed herein. In some examples, evaluating scan window k may include bit shifting binary coded representations associated with the pixel coordinates provided via model/spatial correlation j to provide a spatial correlation between the binary coded image and the scan window. For example, at a first iteration of operation 1406, first stage 501 may be evaluated and at subsequent iterations (if scan window k has passed earlier iterations), subsequent stages of multiple stages 500 may be evaluated. As subsequent stages are evaluated, the classification and testing of scan window k may classify and test based on different image characteristics (e.g., evaluating for eyes or teeth or the like) and/or the classification and test may become more rigorous (e.g., more positions may be evaluated) and/or more difficult to pass (e.g., with a higher relative threshold, TH). In an embodiment, a first stage includes 10-20 positions, a second stage includes 20-40 positions, and subsequent stages each include more than 40 positions.

Process 1400 may continue at decision operation 1407, "Pass Stage m?", where it may be determined whether scan window j has passed cascade stage m. If scan window k failed cascade stage m, scan window k may be discarded (e.g., via rejected windows module 504) and processing may continue at operation 1410 as discussed below.

If scan window passed cascade stage m, process 1400 may continue at operation 1408, "m=m+1", where the counter variable m may be increased by one, and at decision operation 1409, "Pass All Stages", where it may be determined whether scan window k has passed all the stages. If scan window k has not passed all the stages (e.g., there are more stages in the multi-stage cascade), process 1400 may continue at operation 1406, "Evaluate Cascade Stage m", as discussed above.

If scan window k has passed all the stages, scan window k may be saved or reserved (not shown) for subsequent merging at operation 1417. In such examples, scan window k has been deemed an object candidate region or window (e.g., a region or window determined to have or determined to be likely to have an object of interest therein). In some examples, scan window k may be presented to a user (e.g., in a camera display indicating a facial recognition) in alternative to or in addition to being saved or reserved for later merging.

Process 1400 may continue at operation 1410, "k=k+1", where counter variable k may be increased by one, and at decision operation 1411, "Completed All Scan Windows?", where it may be determined whether all scan windows have been completed (e.g., all scan windows for an input image have been evaluated). If all of the scan windows have not been evaluated, process 1400 may continue at operation 1405, "Predict Scan Window k", where subsequent scan window(s) may be predicted or determined for evaluation as discussed above.

If all of the scan windows have been evaluated, process 1400 may continue at operation 1412, "j=j+1", where counter variable j may be increased by one, and at operation 1413, "Completed All Models/Spatial Correlations", where it may be determined whether all object detection models and spatial correlations have been completed (e.g., all object detection models either stored in memory or generated as discussed herein may have been evaluated). If all models and spatial correlations have not been completed, process 1400 may continue at operation 1404, "Load/Generate Model/Spatial Correlation j", where another object detection model and/or spatial orientation with respect to the binary coded image may be loaded or generated.

If all object detection models and spatial correlations have been completed, process 1400 may continue at operation 1414, "i=i+1", where counter variable i may be increased by one and at decision operation 1415, "Completed All Image Scalings?", where it may be determined whether all image scalings have been completed (e.g., all image scalings of the target image have been completed). If all image scalings have not been completed, process 1400 may continue at operation 1402, "Resize Image at scale i", where the image may be resized for repeated processing as discussed (e.g., determination of binary coded image, determination of object detection model and spatial correlation, determination of scan windows, evaluation of scan windows via cascade stages, and so on).

If all image scalings have been completed, process 1400 may continue at operation 1416, "Merge Results", where the results may be merged. For example, any passing scan windows (e.g., object candidate regions) may be merged and saved and/or presented to a user. For example, for each passing scan window, a location and size (e.g., based on the above scaling) of the object candidate region may be saved, used for further processing, and/or presented to a user or the like. In an embodiment, merging the results includes grouping the passing scan windows, merging them, and performing non-maximum suppression. In an example, a first and second scan window may have passed the multi-stage cascade classifier system discussed herein and the scan windows may be merged as object candidate regions. The object candidate regions may be processed by saving to memory, presentment to a user, or the like.

Portions of process 1400 may be repeated any number of times either in series or in parallel for any number pixels, stages, or input images to generate any number of object candidate regions. Also as discussed, the input image(s) may include a decoded image, a captured image (e.g., via a camera or the like), a rendered image, or an image from a sequence of video images or frames, or the like.

FIG. 15 is a flow diagram illustrating an example process 1500 for performing object detection, arranged in accordance with at least some implementations of the present disclosure. Process 1500 may include one or more operations 1501-1503 as illustrated in FIG. 15.

FIG. 16 is a flow diagram illustrating an example process 1600 for performing object detection, arranged in accordance with at least some implementations of the present disclosure. Process 1600 may include one or more operations 1601-1603 as illustrated in FIG. 16.

Process 1500 and/or process 1600 may form at least part of an object detection process. By way of non-limiting example, process 1500 and/or process 1600 may form at least part of an object detection process for system 100 as discussed herein. Furthermore, process 1500 and process 1600 will be described herein with reference to system 1700 of FIG. 17.

Figure 17:
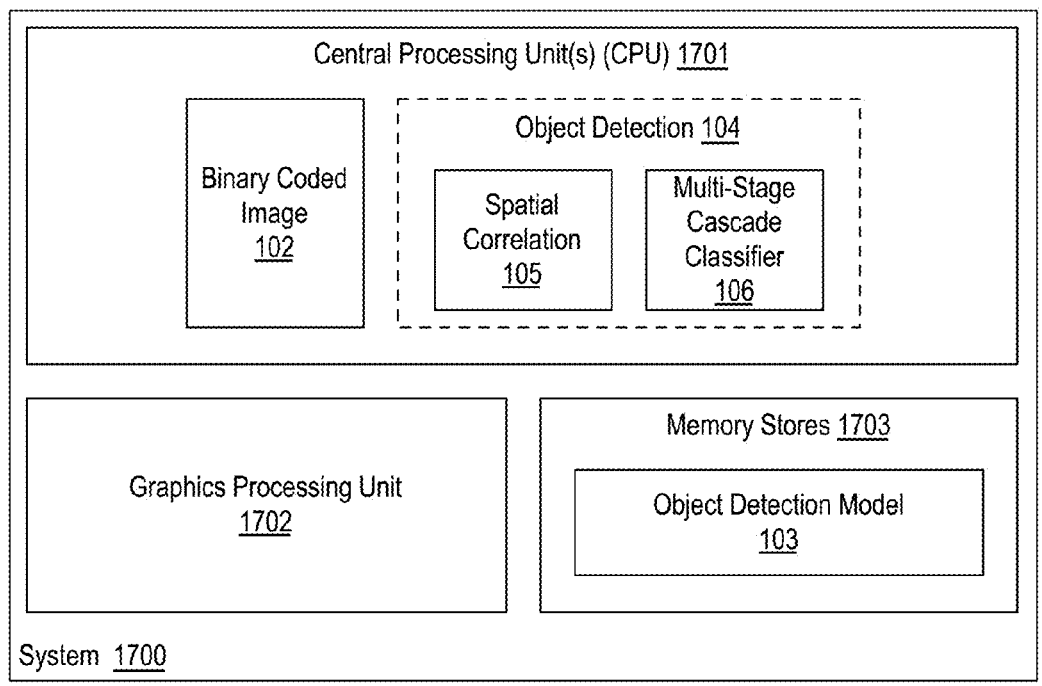
FIG. 17 is an illustrative diagram of an example system for performing object detection.

FIG. 17 is an illustrative diagram of an example system 1700 for performing object detection, arranged in accordance with at least some implementations of the present disclosure. As shown in FIG. 17, system 1700 may include one or more central processing units (CPU) 1701, a graphics processing unit (GPU) 1702, and memory stores 1703. Also as shown, CPU 1701 may include binary coded image module 102 and object detection module 104, which may include spatial correlation module 105 and/or multi-stage cascade classifier module 106. Furthermore, object detection model module 103 may be implemented via memory stores 1703. In the example of system 1700, memory stores 1703 may store object detection models, via object detection model module 103, such as binary coded based object detection models as well as other image data such as input images, binary coded images, look up tables (e.g., nested look up tables as discussed), pixel values, neighboring pixel values, candidate object detection regions, patterns, weights, binary coded representations, thresholds, confidence values, pixel coordinates, group numbers, and/or any other data as discussed herein.

As shown, in some examples, binary coded image module 102 and object detection module 104 may be implemented via central processing units 1701. In other examples, one or both of binary coded image module 102 and object detection module 104 may be implemented via graphics processing unit 1702. In yet other examples, one or both of binary coded image module 102 and object detection module 104 may be implemented via an imaging pipeline and/or an imaging processing unit. Furthermore, memory stores 1703 may store binary coded image based object detection model(s) and/or look up tables associated therewith.

Graphics processing unit 1702 may include any number and type of graphics processing units that may provide the operations as discussed herein. Such operations may be implemented via software or hardware or a combination thereof. For example, graphics processing unit 1702 may include circuitry dedicated to manipulate images obtained from memory stores 1703. Central processing units 1701 may include any number and type of processing units or modules that may provide control and other high level functions for system 1700 and/or provide any operations as discussed herein. Memory stores 1703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1703 may be implemented by cache memory. In an embodiment, one or both of binary coded image module 102 and object detection module 104 may be implemented via an execution unit (EU) of graphics processing unit 1702. The EU may include, for example, programmable logic or circuitry such as a logic core or cores that may provide a wide array of programmable logic functions. In an embodiment, one or both of binary coded image module 102 and object detection module 104 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 15, process 1500 may begin at operation 1501, "Generate a Binary Coded Image", where a binary coded image may be generated based on individual pixels of at least a portion of an input image. For example, the binary coded image may include a plurality of binary coded representations each associated with a pixel of the individual pixels. The binary coded image may be generated for an entire input image, a scaling of an input image, or a portion of an input image. For example, the binary coded image may be generated by binary coded image module 102 as implemented via a central processing unit 1701. In some examples, generating the binary coded image may include generating a first binary coded representation of the plurality of binary coded representations for a first pixel of the individual pixels by assigning, to each of a first plurality of neighbor pixels of the first pixel, a value of 0 or 1 based on a comparison of each pixel value of the first plurality of neighbor pixels to a threshold for the first individual pixel and determining the first binary coded representation based on a sequencing of the assigned values of the first plurality of neighbor pixels.

Processing may continue at operation 1502, "Perform Object Detection for a First Spatial Correlation between the Binary Coded Image and an Object Detection Model", where a first object detection may be performed based on a first spatial correlation mapping between the binary coded image and a binary coded image based object detection model. For example, the binary coded image based object detection model may be loaded from memory stores 1703 and object detection module 104 as implemented via a central processing unit 1701 may perform object detection as discussed herein. In some examples, multi-stage cascade classifier 106 may be applied based on the binary coded image based object detection model to scan windows of an input image based on the binary coded image generated at operation 1501. In some examples, no change to the object detection model may be made to provide the spatial correlation mapping between the binary coded image and the binary coded image based object detection model. In other examples, one or both of the binary coded image and the binary coded image based object detection model may be modified or adjusted to provide the spatial correlation mapping.

Processing may continue at operation 1503, "Perform Object Detection for a Second Spatial Correlation between the Binary Coded Image and an Object Detection Model", where a second object detection may be performed based on a second spatial correlation mapping between the binary coded image and the binary coded image based object detection model. For example, the binary coded image based object detection model may be loaded from memory stores 1703, the binary coded image based object detection model may be modified to provide the second spatial correlation, and object detection module 104 as implemented via a central processing unit 1701 may perform object detection as discussed herein. In some examples, multi-stage cascade classifier 106 may be applied based on the modified binary coded image based object detection model to scan windows of an input image based on the binary coded image generated at operation 1501.

For example, pixel coordinates indicating positions within a portion of the input image and associated with look up tables may be adjusted via spatial correlation module 105 of object detection module 104 to indicate different positions within the portion of the input image. For example, the first spatial correlation may include first pixel coordinates for a look up table of the binary coded image based object detection model indicating a first position within the portion of the input image and the second spatial correlation may include second pixel coordinates for the look up table of the binary coded image based object detection model indicating a second position within the portion of the input image.

Furthermore, the object detection may include bit shifting binary coded representations associated with the adjusted pixel coordinates. For example, the first object detection may be based at least in part on accessing a look up table for a first binary coded representation of a first pixel location within the portion of the input image and the second object detection may be based at least in part on accessing the look up table for a bit shifted binary coded representation of a second binary coded representation of a second pixel location within the portion of the input image. The second pixel location may be a 90 degree rotation from the first pixel location and the bit shifted binary coded representation may include a circular shift by two bits (e.g., shifted left for a clockwise rotation and shifted right for a counterclockwise rotation) of the second binary coded representation of the second pixel location. In some examples, the bit shifting may include a single operation (e.g., of a 90 degree rotation or a mirroring) and, in other examples, the bit shifting may include multiple operations.

In various examples, the spatial correlation mapping may be provided by rotating by 90 degrees, clockwise or counterclockwise, the relationship between the binary coded image and the binary coded image based object detection model or providing a mirror operation. For example, a relationship between the first and second spatial correlation mappings may have a spatial relationship including a 90 degree clockwise rotation, a 90 degree counterclockwise rotation, or a mirror relationship. Furthermore, as discussed, the first or second spatial correlation mappings may be based on a the binary coded image based object detection model stored via memory stores 1703. The binary coded image based object detection model stored via memory stores 1703 may represent any suitable alignment of an object such as a vertically aligned object or a 30 degree offset object or the like.

One or both of the first object detection and the second object detection may be performed based on accessing a look up table structure. For example, the binary coded image based object detection model may include, for a first pixel of the individual pixels, two nested look up tables including a first look up table having group numbers indexed by binary coded representation values and a second look up table including confidence values indexed by the group numbers.

Process 1500 may be repeated any number of times for any number of binary coded images, image scalings, binary coded image based object detection models, spatial correlations, or the like. For example, a third object detection may be performed based on a third spatial correlation mapping between the binary coded image and a second binary coded image based object detection model and a fourth object detection may be performed based on a third spatial correlation mapping between the binary coded image and the second binary coded image based object detection model As discussed, process 1500 may provide for model compression in object detection models as multiple models may be generated an evaluated based on a single stored object detection model.

Turning now to FIG. 16, process 1600 may begin at operation 1601, "Access a First Look Up Table of Group Numbers Indexed by Binary Coded Representations to Determine a Group Number for an Individual Binary Coded Representation", where a first look up table comprising group numbers indexed by binary coded representations may be accessed to determine an individual group number associated with an individual binary coded representation for a pixel of an input image. For example, the individual binary coded representation may be one binary coded representation of a binary coded image. For example, object detection module 104 as implemented via a central processing unit 1701 may access the first look up table stored via memory stores 1703 to determine the individual group number.

Processing may continue at operation 1602, "Access a Second Look Up Table of Confidence Values to Determine a Confidence Value for the Individual Binary Coded Representation", where, based at least in part on the individual group number, a second look up table comprising confidence values may be accessed to determine an individual confidence value associated with the individual binary coded representation. For example, object detection module 104 as implemented via a central processing unit 1701 may access the second look up table stored via memory stores 1703 to determine the individual group number. In some examples, the second look up table may be indexed by the group numbers stored in the first look up tables. In other examples, the second look up table may be indexed based on second group numbers and process 1600 may include accessing a third look up table comprising the second group numbers indexed by the group numbers to determine an individual second group number associated with the individual binary coded representation. In such examples the third look up table may be nested between the first and second look up tables.

Processing may continue at operation 1603, "Perform Object Detection based on the Confidence Value", where an object detection may be performed for an input image based at least in part on the individual confidence value. For example, the confidence value may be summed with other confidence values to determine whether a scan window passes a stage of multi-stage cascade classifier 106 as discussed with respect to Expression (2) and elsewhere herein.

As discussed herein, the first look up table may be associated with pixel coordinates of a location within a scan window of the input image. In some examples, the pixel coordinates may be adjusted to provide an adjusted spatial correlation to the binary coded image. In such examples, a second binary coded representation for a second location within the scan window associated with the adjusted coordinates may be determined, bits of the second binary coded representation may be shifted to generate a bit shifted second binary coded representation, the first look up table may be accessed to determine a second individual group number associated with the bit shifted second binary coded representation, accessing, the second look up table may be accessed, based at least in part on the second individual group number, to determine a second individual confidence value associated with the second individual binary coded representation, and a second object detection may be performed for the input image based at least in part on the second individual confidence value.

Process 1600 may be repeated any number of times for any number of binary coded representations, scan windows, binary coded images, image scalings, binary coded image based object detection models, spatial correlations, or the like. As discussed, process 1600 may provide for model compression in object detection models as the memory footprint of the nested look up tables may be less than that of a single look up table.

Various components of the systems described herein may be implemented in software, firmware, and/or hardware and/or any combination thereof. For example, various components of system 100 or system 1700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 1700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

The discussed object detection (e.g., face detection) systems and processes may provide for real-time object detection across different platforms and different resolutions. As discussed, such object detection systems may be used in human-computer interaction, photo album management, biometrics, video surveillance, automatic focus in camera imaging, image or video search and retrieval, and the like. Furthermore, the discussed systems and processes may have a relatively low memory footprint for models and for computing requirements advantageous for mobile, tablet, or deep embedded system implementations. The discussed systems and processes may also provide increased accuracy.

As compared to prior techniques, the discussed examples may provide the following advantages. For example, the process discussed herein may provide a model size (e.g., of a feature representation) of only about 100 KB (as compared to >1 MB in some prior methods) and a required computing memory of only about 1× the image size (as compared to 8× or 32×the image size in some prior methods). Furthermore, as discussed, the number of stages in the classifier cascade may be about 4 to 12 stages, with only 4 or 5 stages being needed in some implementations (as compared to up to 30 stages in some prior methods). The discussed techniques may also be suitable to fixed point operations, parallel processing, and/or single instruction multiple data (SIMD) operations, which may provide processing speeds of about 240 fps (frames per second) for VGA, 70 fps for HD, and/or 30 fps for Full-HD (as compared to 60-100 fps for VGA, 12-14 fps for HD, and 3-5 fps for Full-HD in some prior methods). Real-time operations of the discussed techniques may be attained (e.g., 15 fps on QVGA (Quarter Video Graphics Array)) on a CPU using only 400 MHz and 16 KB of cache, which may be implemented, as discussed, in mobile devices. In some examples, faster processing (e.g., about 3× to 5× faster) may be provided using execution unit (EU) implementations and/or dedicated hardware such as fixed function circuitry or the like.

Furthermore, the discussed techniques may provide enhanced or comparable accuracy as compared to prior methods. For examples, based on the University of Massachusetts Face Detection Data Set and Benchmark (UMass FDDB), the discussed techniques provided increased performance in terms of increased true positive rate and decreased false positive rate.

Figure 18:
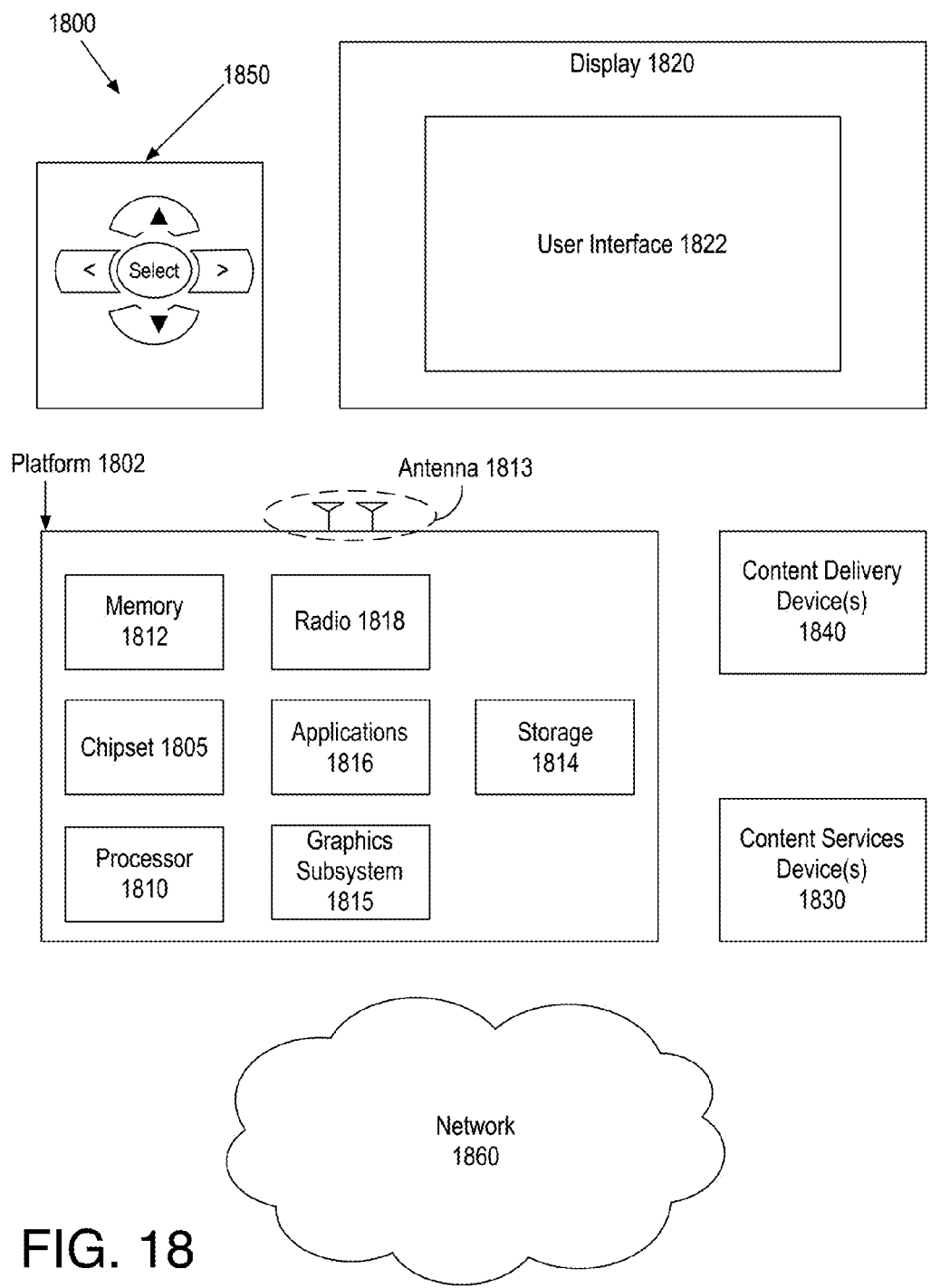
FIG. 18 is an illustrative diagram of an example system.

FIG. 18 is an illustrative diagram of an example system 1800, arranged in accordance with at least some implementations of the present disclosure. In various implementations, system 1800 may be a media system although system 1800 is not limited to this context. For example, system 1800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1800 includes a platform 1802 coupled to a display 1820. Platform 1802 may receive content from a content device such as content services device(s) 1830 or content delivery device(s) 1840 or other similar content sources. A navigation controller 1850 including one or more navigation features may be used to interact with, for example, platform 1802 and/or display 1820. Each of these components is described in greater detail below.

In various implementations, platform 1802 may include any combination of a chipset 1805, processor 1810, memory 1812, antenna 1813, storage 1814, graphics subsystem 1815, applications 1816 and/or radio 1818. Chipset 1805 may provide intercommunication among processor 1810, memory 1812, storage 1814, graphics subsystem 1815, applications 1816 and/or radio 1818. For example, chipset 1805 may include a storage adapter (not depicted) capable of providing intercommunication with storage 1814.

Processor 1810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1810 may be dual-core processor(s), dual-core mobile processor(s), and so forth.

Memory 1812 may be implemented as a volatile memory device such as, but not limited to, a Random Access Memory (RAM), Dynamic Random Access Memory (DRAM), or Static RAM (SRAM).

Storage 1814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1814 may include technology to increase the storage performance enhanced protection for valuable digital media when multiple hard drives are included, for example.

Graphics subsystem 1815 may perform processing of images such as still or video for display. Graphics subsystem 1815 may be a graphics processing unit (GPU) or a visual processing unit (VPU), for example. An analog or digital interface may be used to communicatively couple graphics subsystem 1815 and display 1820. For example, the interface may be any of a High-Definition Multimedia Interface, DisplayPort, wireless HDMI, and/or wireless HD compliant techniques. Graphics subsystem 1815 may be integrated into processor 1810 or chipset 1805. In some implementations, graphics subsystem 1815 may be a stand-alone device communicatively coupled to chipset 1805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1818 may operate in accordance with one or more applicable standards in any version.

In various implementations, display 1820 may include any television type monitor or display. Display 1820 may include, for example, a computer display screen, touch screen display, video monitor, television-like device, and/or a television. Display 1820 may be digital and/or analog. In various implementations, display 1820 may be a holographic display. Also, display 1820 may be a transparent surface that may receive a visual projection. Such projections may convey various forms of information, images, and/or objects. For example, such projections may be a visual overlay for a mobile augmented reality (MAR) application. Under the control of one or more software applications 1816, platform 1802 may display user interface 1822 on display 1820.

In various implementations, content services device(s) 1830 may be hosted by any national, international and/or independent service and thus accessible to platform 1802 via the Internet, for example. Content services device(s) 1830 may be coupled to platform 1802 and/or to display 1820. Platform 1802 and/or content services device(s) 1830 may be coupled to a network 1860 to communicate (e.g., send and/or receive) media information to and from network 1860. Content delivery device(s) 1840 also may be coupled to platform 1802 and/or to display 1820.

In various implementations, content services device(s) 1830 may include a cable television box, personal computer, network, telephone, Internet enabled devices or appliance capable of delivering digital information and/or content, and any other similar device capable of uni-directionally or bi-directionally communicating content between content providers and platform 1802 and/display 1820, via network 1860 or directly. It will be appreciated that the content may be communicated uni-directionally and/or bi-directionally to and from any one of the components in system 1800 and a content provider via network 1860. Examples of content may include any media information including, for example, video, music, medical and gaming information, and so forth.

Content services device(s) 1830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1802 may receive control signals from navigation controller 1850 having one or more navigation features. The navigation features of controller 1850 may be used to interact with user interface 1822, for example. In various embodiments, navigation controller 1850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1850 may be replicated on a display (e.g., display 1820) by movements of a pointer, cursor, focus ring, or other visual indicators displayed on the display. For example, under the control of software applications 1816, the navigation features located on navigation controller 1850 may be mapped to virtual navigation features displayed on user interface 1822, for example. In various embodiments, controller 1850 may not be a separate component but may be integrated into platform 1802 and/or display 1820. The present disclosure, however, is not limited to the elements or in the context shown or described herein.

In various implementations, drivers (not shown) may include technology to enable users to instantly turn on and off platform 1802 like a television with the touch of a button after initial boot-up, when enabled, for example. Program logic may allow platform 1802 to stream content to media adaptors or other content services device(s) 1830 or content delivery device(s) 1840 even when the platform is turned "off." In addition, chipset 1805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1800 may be integrated. For example, platform 1802 and content services device(s) 1830 may be integrated, or platform 1802 and content delivery device(s) 1840 may be integrated, or platform 1802, content services device(s) 1830, and content delivery device(s) 1840 may be integrated, for example. In various embodiments, platform 1802 and display 1820 may be an integrated unit. Display 1820 and content service device(s) 1830 may be integrated, or display 1820 and content delivery device(s) 1840 may be integrated, for example. These examples are not meant to limit the present disclosure.

In various embodiments, system 1800 may be implemented as a wireless system, a wired system, or a combination of both. When implemented as a wireless system, system 1800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 18.

Figure 19:
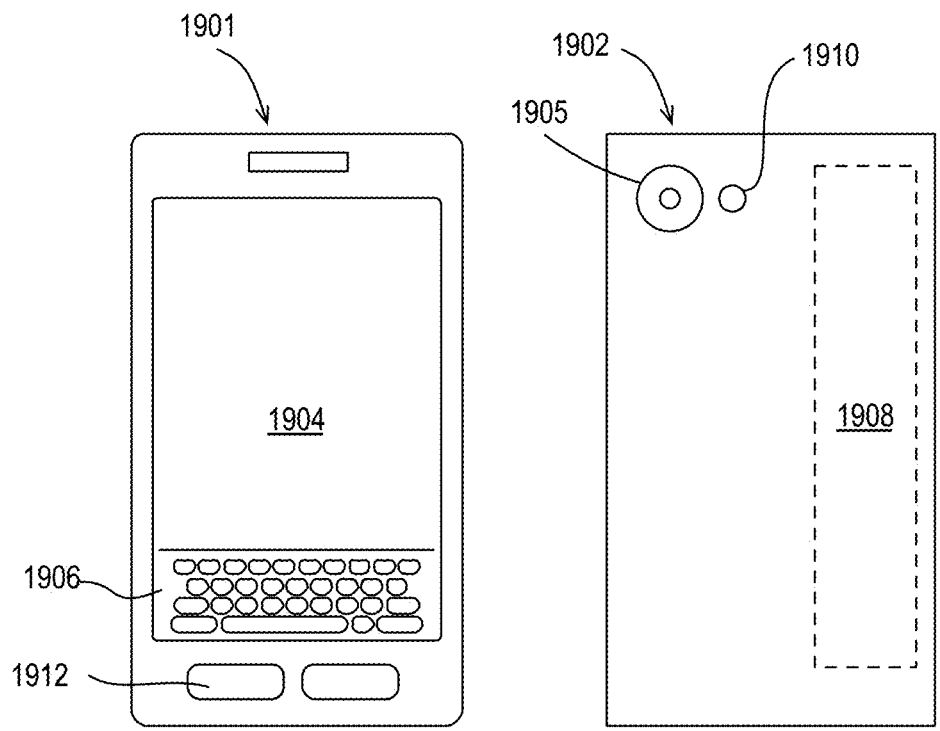
FIG. 19 illustrates an example small form factor device, all arranged in accordance with at least some implementations of the present disclosure.

As described above, system 1800 may be embodied in varying physical styles or form factors. FIG. 19 illustrates an example small form factor device 1900, arranged in accordance with at least some implementations of the present disclosure. In some examples, system 1800 may be implemented via device 1900. In other examples, imaging device 101, system 900, or portions thereof may be implemented via device 1900. In various embodiments, for example, device 1900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 19, device 1900 may include a housing with a front 1901 and a back 1902. Device 1900 includes a display 1904, an input/output (I/O) device 1906, and an integrated antenna 1908. Device 1900 also may include navigation features 1912. I/O device 1906 may include any suitable I/O device for entering information into a mobile computing device. Examples for I/O device 1906 may include an alphanumeric keyboard, a numeric keypad, a touch pad, input keys, buttons, switches, microphones, speakers, voice recognition device and software, and so forth. Information also may be entered into device 1900 by way of microphone (not shown), or may be digitized by a voice recognition device. As shown, device 1900 may include a camera 1905 (e.g., including a lens, an aperture, and an imaging sensor) and a flash 1910 integrated into back 1902 (or elsewhere) of device 1900. In other examples, camera 1905 and flash 1910 may be integrated into front 1901 of device 1900 or both front and back cameras may be provided. Camera 1905 and flash 1910 may be components of a camera module to originate image data processed into streaming video that is output to display 1904 and/or communicated remotely from device 1900 via antenna 1908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for performing object detection comprises generating a binary coded image based on individual pixels of at least a portion of an input image, the binary coded image comprising a plurality of binary coded representations each associated with a pixel of the individual pixels, performing a first object detection based on a first spatial correlation mapping between the binary coded image and a binary coded image based object detection model, and performing a second object detection based on a second spatial correlation mapping between the binary coded image and the binary coded image based object detection model.

Further to the first embodiments, the first spatial correlation comprises first pixel coordinates for a look up table of the binary coded image based object detection model indicating a first position within the portion of the input image and the second spatial correlation comprises second pixel coordinates for the look up table of the binary coded image based object detection model indicating a second position within the portion of the input image.

Further to the first embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image.

Further to the first embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image, wherein the second pixel location is a 90 degree rotation from the first pixel location and the bit shifted binary coded representation comprises a circular shift by two bits of the second binary coded representation of the second pixel location.

Further to the first embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image, wherein the bit shifted binary coded representation comprises at least two bit shifting operations on the second binary coded representation of the second pixel location.

Further to the first embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image and/or wherein the second pixel location is a 90 degree rotation from the first pixel location and the bit shifted binary coded representation comprises a circular shift by two bits of the second binary coded representation of the second pixel location and/or wherein the bit shifted binary coded representation comprises at least two bit shifting operations on the second binary coded representation of the second pixel location.

Further to the first embodiments, the binary coded image based object detection model represents at least one of a vertically aligned object or a 30 degree offset object, and wherein the first spatial correlation and the second spatial correlation comprise a spatial relationship comprising at least one of a 90 degree clockwise rotation, a 90 degree counterclockwise rotation, or a mirror relationship.

Further to the first embodiments, the binary coded image based object detection model comprises, for a first pixel of the individual pixels, two nested look up tables comprising a first look up table comprising group numbers indexed by binary coded representation values and a second look up table comprising confidence values indexed by the group numbers.

Further to the first embodiments, the method further comprises performing a third object detection based on a third spatial correlation mapping between the binary coded image and a second binary coded image based object detection model and performing a fourth object detection based on a fourth spatial correlation mapping between the binary coded image and the second binary coded image based object detection model.

Further to the first embodiments, generating the binary coded image comprises generating a first binary coded representation of the plurality of binary coded representations for a first pixel of the individual pixels by assigning, to each of a first plurality of neighbor pixels of the first pixel, a value of 0 or 1 based on a comparison of each pixel value of the first plurality of neighbor pixels to a threshold for the first individual pixel and determining the first binary coded representation based on a sequencing of the assigned values of the first plurality of neighbor pixels.

Further to the first embodiments, the method further comprises performing a third object detection based on a third spatial correlation mapping between the binary coded image and a second binary coded image based object detection model and performing a fourth object detection based on a fourth spatial correlation mapping between the binary coded image and the second binary coded image based object detection model, and/or wherein generating the binary coded image comprises generating a first binary coded representation of the plurality of binary coded representations for a first pixel of the individual pixels by assigning, to each of a first plurality of neighbor pixels of the first pixel, a value of 0 or 1 based on a comparison of each pixel value of the first plurality of neighbor pixels to a threshold for the first individual pixel and determining the first binary coded representation based on a sequencing of the assigned values of the first plurality of neighbor pixels.

In one or more second embodiments, a computer-implemented method for performing object detection comprises accessing a first look up table comprising group numbers indexed by binary coded representation values to determine an individual group number associated with an individual binary coded representation of a binary coded image representing an input image, accessing, based at least in part on the individual group number, a second look up table comprising confidence values to determine an individual confidence value associated with the individual binary coded representation, and performing an object detection for the input image based at least in part on the individual confidence value.

Further to the second embodiments, the second look up table is indexed based on the group numbers.

Further to the second embodiments, the second look up table is indexed based on second group numbers and the method further comprises accessing a third look up table comprising the second group numbers indexed by the group numbers to determine an individual second group number associated with the individual binary coded representation.

Further to the second embodiments, the second look up table is indexed based on the group numbers, and/or the second look up table is indexed based on second group numbers and the method further comprises accessing a third look up table comprising the second group numbers indexed by the group numbers to determine an individual second group number associated with the individual binary coded representation.

Further to the second embodiments, the first look up table is associated with pixel coordinates of a location within a scan window of the input image and the method further comprises adjusting the pixel coordinates associated with the first look up table to provide an adjusted spatial correlation to the binary coded image.

Further to the second embodiments, the first look up table is associated with pixel coordinates of a location within a scan window of the input image and the method further comprises adjusting the pixel coordinates associated with the first look up table to provide an adjusted spatial correlation to the binary coded image, determining a second binary coded representation for a second location within the scan window associated with the adjusted coordinates, shifting bits of the second binary coded representation to generate a bit shifted second binary coded representation, accessing the first look up table to determine a second individual group number associated with the bit shifted second binary coded representation, accessing, based at least in part on the second individual group number, the second look up table to determine a second individual confidence value associated with the second individual binary coded representation, and performing a second object detection for the input image based at least in part on the second individual confidence value.

Further to the second embodiments, the first look up table is associated with pixel coordinates of a location within a scan window of the input image and the method further comprises adjusting the pixel coordinates associated with the first look up table to provide an adjusted spatial correlation to the binary coded image and/or determining a second binary coded representation for a second location within the scan window associated with the adjusted coordinates, shifting bits of the second binary coded representation to generate a bit shifted second binary coded representation, accessing the first look up table to determine a second individual group number associated with the bit shifted second binary coded representation, accessing, based at least in part on the second individual group number, the second look up table to determine a second individual confidence value associated with the second individual binary coded representation, and performing a second object detection for the input image based at least in part on the second individual confidence value.

In one or more third embodiments, a system for providing object detection on a computing device comprises a memory configured to store a binary coded image based object detection model and a processing unit coupled to the display device, wherein the processing unit comprises binary coded image circuitry to generate a binary coded image based on individual pixels of at least a portion of an input image, the binary coded image comprising a plurality of binary coded representations each associated with a pixel of the individual pixels and object detection circuitry to perform a first object detection based on a first spatial correlation mapping between the binary coded image and the binary coded image based object detection model and to perform a second object detection based on a second spatial correlation mapping between the binary coded image and the binary coded image based object detection model.

Further to the third embodiments, the first spatial correlation comprises first pixel coordinates for a look up table of the binary coded image based object detection model associated with a first position within the portion of the input image and the second spatial correlation comprises second pixel coordinates for the look up table of the binary coded image based object detection model associated with a second position within the portion of the input image.

Further to the third embodiments, the first object detection is based at least in part on a first look up table access for a first binary coded representation of a first pixel location within the portion of the input image and the second object detection is based at least in part on a second access of the look up table for a bit shifted binary coded representation of a second binary coded representation of a second pixel location within the portion of the input image.

Further to the third embodiments, the first object detection is based at least in part on a first look up table access for a first binary coded representation of a first pixel location within the portion of the input image and the second object detection is based at least in part on a second access of the look up table for a bit shifted binary coded representation of a second binary coded representation of a second pixel location within the portion of the input image, wherein the second pixel location is a 90 degree rotation from the first pixel location and the bit shifted binary coded representation comprises a circular shift by two bits of the second binary coded representation of the second pixel location.

Further to the third embodiments, the first object detection is based at least in part on a first look up table access for a first binary coded representation of a first pixel location within the portion of the input image and the second object detection is based at least in part on a second access of the look up table for a bit shifted binary coded representation of a second binary coded representation of a second pixel location within the portion of the input image, wherein the bit shifted binary coded representation comprises at least two bit shifting operations on the second binary coded representation of the second pixel location.

Further to the third embodiments, the binary coded image based object detection model comprises, for a first pixel of the individual pixels, two nested look up tables comprising a first look up table comprising group numbers indexed by binary coded representation values and a second look up table comprising confidence values indexed by the group numbers.

Further to the third embodiments, the object detection circuitry is to perform a third object detection based on a third spatial correlation mapping between the binary coded image and a second binary coded image based object detection model and perform a fourth object detection based on a fourth spatial correlation mapping between the binary coded image and the second binary coded image based object detection model.

Further to the third embodiments, the binary coded image based object detection model comprises, for a first pixel of the individual pixels, two nested look up tables comprising a first look up table comprising group numbers indexed by binary coded representation values and a second look up table comprising confidence values indexed by the group numbers and/or wherein the object detection circuitry is to perform a third object detection based on a third spatial correlation mapping between the binary coded image and a second binary coded image based object detection model and perform a fourth object detection based on a fourth spatial correlation mapping between the binary coded image and the second binary coded image based object detection model.

In one or more fourth embodiments, system for providing object detection on a computing device comprises a memory configured to store a first look up table and a second look up table and a processing unit coupled to the display device, wherein the processing unit comprises object detection circuitry to access the first look up table comprising group numbers indexed by binary coded representation values to determine an individual group number associated with an individual binary coded representation for a pixel of an input image, access, based at least in part on the individual group number, the second look up table comprising confidence values to determine an individual confidence value associated with the individual binary coded representation, and perform object detection for the input image based at least in part on the individual confidence value.

Further to the fourth embodiments, the second look up table is indexed based on the group numbers.

Further to the fourth embodiments, the second look up table is indexed based on second group numbers, the object detection circuitry to access a third look up table comprising the second group numbers indexed by the group numbers to determine an individual second group number associated with the individual binary coded representation.

Further to the fourth embodiments, the first look up table is associated with pixel coordinates of a location within a scan window of the input image, and wherein the object detection circuitry is further to adjust the pixel coordinates associated with the first look up table to provide an adjusted spatial correlation to the binary coded image.

Further to the fourth embodiments, the first look up table is associated with pixel coordinates of a location within a scan window of the input image, and wherein the object detection circuitry is further to adjust the pixel coordinates associated with the first look up table to provide an adjusted spatial correlation to the binary coded image, wherein the object detection circuitry is further to receive a second binary coded representation for a second location within the scan window associated with the adjusted coordinates, shift bits of the second binary coded representation to generate a bit shifted second binary coded representation, access the first look up table to determine a second individual group number associated with the bit shifted second binary coded representation, access, based at least in part on the second individual group number, the second look up table to determine a second individual confidence value associated with the second individual binary coded representation, and perform a second object detection for the input image based at least in part on the second individual confidence value.

Further to the fourth embodiments, the first look up table is associated with pixel coordinates of a location within a scan window of the input image, and wherein the object detection circuitry is further to adjust the pixel coordinates associated with the first look up table to provide an adjusted spatial correlation to the binary coded image, and/or wherein the object detection circuitry is further to receive a second binary coded representation for a second location within the scan window associated with the adjusted coordinates, shift bits of the second binary coded representation to generate a bit shifted second binary coded representation, access the first look up table to determine a second individual group number associated with the bit shifted second binary coded representation, access, based at least in part on the second individual group number, the second look up table to determine a second individual confidence value associated with the second individual binary coded representation, and perform a second object detection for the input image based at least in part on the second individual confidence value.

In one or more fifth embodiments, a system for providing object detection on a computing device comprises means for generating a binary coded image based on individual pixels of at least a portion of an input image, the binary coded image comprising a plurality of binary coded representations each associated with a pixel of the individual pixels, means for performing a first object detection based on a first spatial correlation mapping between the binary coded image and a binary coded image based object detection model, and means for performing a second object detection based on a second spatial correlation mapping between the binary coded image and the binary coded image based object detection model.

Further to the fifth embodiments, the first spatial correlation comprises first pixel coordinates for a look up table of the binary coded image based object detection model indicating a first position within the portion of the input image and the second spatial correlation comprises second pixel coordinates for the look up table of the binary coded image based object detection model indicating a second position within the portion of the input image.

Further to the fifth embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image.

Further to the fifth embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image, wherein the second pixel location is a 90 degree rotation from the first pixel location and the bit shifted binary coded representation comprises a circular shift by two bits of the second binary coded representation of the second pixel location.

Further to the fifth embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image, wherein the bit shifted binary coded representation comprises at least two bit shifting operations on the second binary coded representation of the second pixel location.

Further to the fifth embodiments, the binary coded image based object detection model comprises, for a first pixel of the individual pixels, two nested look up tables comprising a first look up table comprising group numbers indexed by binary coded representation values and a second look up table comprising confidence values indexed by the group numbers.

Further to the fifth embodiments, the system further comprises means for performing a third object detection based on a third spatial correlation mapping between the binary coded image and a second binary coded image based object detection model and means for performing a fourth object detection based on a fourth spatial correlation mapping between the binary coded image and the second binary coded image based object detection model.

In one or more sixth embodiments, a system for providing object detection on a computing device comprises means for accessing a first look up table comprising group numbers indexed by binary coded representation values to determine an individual group number associated with an individual binary coded representation of a binary coded image representing an input image, means for accessing, based at least in part on the individual group number, a second look up table comprising confidence values to determine an individual confidence value associated with the individual binary coded representation, and means for performing an object detection for the input image based at least in part on the individual confidence value.

Further to the sixth embodiments, the first look up table is associated with pixel coordinates of a location within a scan window of the input image and the system further comprises means for adjusting the pixel coordinates associated with the first look up table to provide an adjusted spatial correlation to the binary coded image.

Further to the sixth embodiments, the system further comprises means for determining a second binary coded representation for a second location within the scan window associated with the adjusted coordinates, means for shifting bits of the second binary coded representation to generate a bit shifted second binary coded representation, means for accessing the first look up table to determine a second individual group number associated with the bit shifted second binary coded representation, means for accessing, based at least in part on the second individual group number, the second look up table to determine a second individual confidence value associated with the second individual binary coded representation, and means for performing a second object detection for the input image based at least in part on the second individual confidence value.

In one or more seventh embodiments, at least one machine readable medium comprises a plurality of instructions that in response to being executed on a computing device cause the computing device to perform object detection by generating a binary coded image based on individual pixels of at least a portion of an input image, the binary coded image comprising a plurality of binary coded representations each associated with a pixel of the individual pixels, performing a first object detection based on a first spatial correlation mapping between the binary coded image and a binary coded image based object detection model, and performing a second object detection based on a second spatial correlation mapping between the binary coded image and the binary coded image based object detection model.

Further to the seventh embodiments, the first spatial correlation comprises first pixel coordinates for a look up table of the binary coded image based object detection model indicating a first position within the portion of the input image and the second spatial correlation comprises second pixel coordinates for the look up table of the binary coded image based object detection model indicating a second position within the portion of the input image.

Further to the seventh embodiments, the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image.

Further to the seventh embodiments, the binary coded image based object detection model comprises, for a first pixel of the individual pixels, two nested look up tables comprising a first look up table comprising group numbers indexed by binary coded representation values and a second look up table comprising confidence values indexed by the group numbers.

Further to the seventh embodiments, the machine readable medium comprises further instructions that in response to being executed on a computing device cause the computing device to perform object detection by performing a third object detection based on a third spatial correlation mapping between the binary coded image and a second binary coded image based object detection model and performing a fourth object detection based on a fourth spatial correlation mapping between the binary coded image and the second binary coded image based object detection model.

In one or more eighth embodiments, at least one machine readable medium comprises a plurality of instructions that in response to being executed on a computing device, cause the computing device to perform object detection by accessing a first look up table comprising group numbers indexed by binary coded representation values to determine an individual group number associated with an individual binary coded representation of a binary coded image representing an input image, accessing, based at least in part on the individual group number, a second look up table comprising confidence values to determine an individual confidence value associated with the individual binary coded representation, and performing an object detection for the input image based at least in part on the individual confidence value.

Further to the eighth embodiments, the first look up table is associated with pixel coordinates of a location within a scan window of the input image and the machine readable medium comprises further instructions that in response to being executed on a computing device cause the computing device to perform object detection by adjusting the pixel coordinates associated with the first look up table to provide an adjusted spatial correlation to the binary coded image.

Further to the eighth embodiments, the machine readable medium comprises further instructions that in response to being executed on a computing device, cause the computing device to perform object detection by determining a second binary coded representation for a second location within the scan window associated with the adjusted coordinates, shifting bits of the second binary coded representation to generate a bit shifted second binary coded representation, accessing the first look up table to determine a second individual group number associated with the bit shifted second binary coded representation, accessing, based at least in part on the second individual group number, the second look up table to determine a second individual confidence value associated with the second individual binary coded representation, and performing a second object detection for the input image based at least in part on the second individual confidence value.

In one or more ninth embodiments, at least one machine readable medium may include a plurality of instructions that in response to being executed on a computing device, causes the computing device to perform a method according to any one of the above embodiments.

In one or more tenth embodiments, an apparatus may include means for performing a method according to any one of the above embodiments.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A computer-implemented method for performing object detection comprising:
    generating a plurality of binary coded representations each associated with a pixel of individual pixels of at least a portion of an input image;
    performing a first object detection based on a first spatial correlation mapping between the binary coded representations and a binary coded image based object detection model; and
    performing a second object detection based on a second spatial correlation mapping between the binary coded representations and the binary coded image based object detection model.

2. The method of claim 1, wherein the first spatial correlation mapping comprises first pixel coordinates for a look up table of the binary coded image based object detection model indicating a first position within the portion of the input image and the second spatial correlation mapping comprises second pixel coordinates for the look up table of the binary coded image based object detection model indicating a second position within the portion of the input image.

3. The method of claim 1, wherein the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image.

4. The method of claim 3, wherein the second pixel location is a 90 degree rotation from the first pixel location and the bit shifted binary coded representation comprises a circular shift by two bits of the second binary coded representation of the second pixel location.

5. The method of claim 3, wherein the bit shifted binary coded representation comprises at least two bit shifting operations on the second binary coded representation of the second pixel location.

6. The method of claim 1, wherein the binary coded image based object detection model represents at least one of a vertically aligned object or a 30 degree offset object, and wherein the first spatial correlation and the second spatial correlation comprise a spatial relationship comprising at least one of a 90 degree clockwise rotation, a 90 degree counterclockwise rotation, or a mirror relationship.

7. The method of claim 1, wherein the binary coded image based object detection model comprises, for a first pixel of the individual pixels, two nested look up tables comprising a first look up table comprising group numbers indexed by binary coded representation values and a second look up table comprising confidence values indexed by the group numbers.

8. The method of claim 1, further comprising:
    performing a third object detection based on a third spatial correlation mapping between the binary coded representations and a second binary coded image based object detection model; and
    performing a fourth object detection based on a fourth spatial correlation mapping between the binary coded representations and the second binary coded image based object detection model.

9. The method of claim 1, wherein generating the plurality of binary coded representations comprises generating a first binary coded representation of the plurality of binary coded representations for a first pixel of the individual pixels by assigning, to each of a first plurality of neighbor pixels of the first pixel, a value of 0 or 1 based on a comparison of each pixel value of the first plurality of neighbor pixels to a threshold for the first individual pixel and determining the first binary coded representation based on a sequencing of the assigned values of the first plurality of neighbor pixels.

10. A computer-implemented method for performing object detection comprising:
    determining, from a plurality of group numbers, an individual group number associated with an individual binary coded representation corresponding to an individual pixel of an input image;
    determining, from a plurality of confidence values and based at least in part on the individual group number, an individual confidence value associated with the individual binary coded representation; and
    performing an object detection for the input image based at least in part on the individual confidence value.

11. The method of claim 10, further comprising:
    determining an individual second group number associated with the individual binary coded representation, wherein determining the individual confidence value comprises determining the individual confidence value based on the individual second group number.

12. The method of claim 10, wherein the plurality of group numbers are associated with pixel coordinates of a location within a scan window of the input image, the method further comprising:
adjusting the pixel coordinates associated with the plurality of group numbers to provide an adjusted spatial correlation to a binary coded image comprising the individual binary coded representation.

13. The method of claim 12, further comprising:
determining a second binary coded representation for a second location within the scan window associated with the adjusted coordinates;
shifting bits of the second binary coded representation to generate a bit shifted second binary coded representation;
determining, from the plurality of group numbers, a second individual group number associated with the bit shifted second binary coded representation;
determining, from the plurality of confidence values and based at least in part on the second individual group number, a second individual confidence value associated with the second individual binary coded representation; and
performing a second object detection for the input image based at least in part on the second individual confidence value.

14. A system for providing object detection on a computing device, comprising:
a memory to store a binary coded image based object detection model; and
a processor coupled to the memory, the processor to:
generate a plurality of binary coded representations each associated with a pixel of individual pixels of at least a portion of an input image;
perform a first object detection based on a first spatial correlation mapping between the binary coded representations and a binary coded image based object detection model; and
perform a second object detection based on a second spatial correlation mapping between the binary coded representations and the binary coded image based object detection model.

15. The system of claim 14, wherein the first spatial correlation mapping comprises first pixel coordinates for a look up table of the binary coded image based object detection model associated with a first position within the portion of the input image and the second spatial correlation mapping comprises second pixel coordinates for the look up table of the binary coded image based object detection model associated with a second position within the portion of the input image.

16. The system of claim 14, wherein the first object detection is based at least in part on a first look up table access for a first binary coded representation of a first pixel location within the portion of the input image and the second object detection is based at least in part on a second access of the look up table for a bit shifted binary coded representation of a second binary coded representation of a second pixel location within the portion of the input image.

17. The system of claim 14, wherein the binary coded image based object detection model comprises, for a first pixel of the individual pixels, two nested look up tables comprising a first look up table comprising group numbers indexed by binary coded representation values and a second look up table comprising confidence values indexed by the group numbers.

18. The system of claim 14, wherein the processor is further to:
perform a third object detection based on a third spatial correlation mapping between the binary coded representations and a second binary coded image based object detection model; and
perform a fourth object detection based on a fourth spatial correlation mapping between the binary coded representations and the second binary coded image based object detection model.

19. A system for providing object detection on a computing device, comprising:
a memory to store a plurality of group numbers and a plurality of confidence values; and
a processing unit coupled to the memory, the processor to:
determine, from the plurality of group numbers, an individual group number associated with an individual binary coded representation corresponding to an individual pixel of an input image;
determine, from the plurality of confidence values and based at least in part on the individual group number, an individual confidence value associated with the individual binary coded representation; and
perform an object detection for the input image based at least in part on the individual confidence value.

20. The system of claim 19, wherein the plurality of group numbers are associated with pixel coordinates of a location within a scan window of the input image and the processor is further to:
adjust the pixel coordinates associated with the plurality of group numbers to provide an adjusted spatial correlation to a binary coded image comprising the individual binary coded representation.

21. The system of claim 20, wherein the processor is further to:
determine a second binary coded representation for a second location within the scan window associated with the adjusted coordinates;
shift bits of the second binary coded representation to generate a bit shifted second binary coded representation;
determine, from the plurality of group numbers, a second individual group number associated with the bit shifted second binary coded representation;
determine, from the plurality of confidence values and based at least in part on the second individual group number, a second individual confidence value associated with the second individual binary coded representation; and
perform a second object detection for the input image based at least in part on the second individual confidence value.

22. At least one non-transitory machine readable medium comprising a plurality of instructions that, in response to being executed on a computing device, cause the computing device to perform object detection by:
generating a plurality of binary coded representations each associated with a pixel of individual pixels of at least a portion of an input image;
performing a first object detection based on a first spatial correlation mapping between the binary coded representations and a binary coded image based object detection model; and performing a second object detection based on a second spatial correlation mapping between the binary coded representations and the binary coded image based object detection model.

23. The machine readable medium of claim 22, wherein the first spatial correlation mapping comprises first pixel coordinates for a look up table of the binary coded image based object detection model indicating a first position within the portion of the input image and the second spatial correlation mapping comprises second pixel coordinates for the look up table of the binary coded image based object detection model indicating a second position within the portion of the input image.

24. The machine readable medium of claim 22, wherein the first object detection is based at least in part on accessing a look up table for a first binary coded representation of a first pixel location within the portion of the input image and the second object detection is based at least in part on accessing the look up table for a bit shifted binary coded representation of a second binary coded representation of a second pixel location within the portion of the input image.

25. The machine readable medium of claim 22, wherein the binary coded image based object detection model comprises, for a first pixel of the individual pixels, two nested look up tables comprising a first look up table comprising group numbers indexed by binary coded representation values and a second look up table comprising confidence values indexed by the group numbers.

26. The machine readable medium of claim 22, the machine readable medium comprising further instructions that in response to being executed on a computing device, cause the computing device to perform object detection by:
   performing a third object detection based on a third spatial correlation mapping between the binary coded representations and a second binary coded image based object detection model; and
   performing a fourth object detection based on a fourth spatial correlation mapping between the binary coded representations and the second binary coded image based object detection model.

27. At least one non-transitory machine readable medium comprising a plurality of instructions that, in response to being executed on a computing device, cause the computing device to perform object detection by:
   determining, from a plurality of group numbers, an individual group number associated with an individual binary coded representation corresponding to an individual pixel of an input image;
   determining, from a plurality of confidence values and based at least in part on the individual group number, an individual confidence value associated with the individual binary coded representation; and
   performing an object detection for the input image based at least in part on the individual confidence value.

28. The machine readable medium of claim 27, wherein the plurality of group numbers are associated with pixel coordinates of a location within a scan window of the input image, the machine readable medium comprising further instructions that in response to being executed on a computing device, cause the computing device to perform object detection by:
   adjusting the pixel coordinates associated with the plurality of group numbers to provide an adjusted spatial correlation to a binary coded image comprising the individual binary coded representation.

29. The machine readable medium of claim 28, the machine readable medium comprising further instructions that in response to being executed on a computing device, cause the computing device to perform object detection by:
   determining a second binary coded representation for a second location within the scan window associated with the adjusted coordinates;
   shifting bits of the second binary coded representation to generate a bit shifted second binary coded representation;
   determining, from the plurality of group numbers, a second individual group number associated with the bit shifted second binary coded representation;
   determining, from the plurality of confidence values and based at least in part on the second individual group number, a second individual confidence value associated with the second individual binary coded representation; and
   performing a second object detection for the input image based at least in part on the second individual confidence value.

* * * * *